United States Patent
Katayama

(10) Patent No.: US 7,475,128 B2
(45) Date of Patent: Jan. 6, 2009

(54) INFORMATION PROCESSING DEVICE, INFORMATION PROCESSING METHOD, AND COMPUTER PROGRAM

(75) Inventor: Yasushi Katayama, Tokyo (JP)

(73) Assignee: Sony Corporation, Tokyo (JP)

( * ) Notice: Subject to any disclaimer, the term of this patent is extended or adjusted under 35 U.S.C. 154(b) by 631 days.

(21) Appl. No.: 10/499,821

(22) PCT Filed: Nov. 18, 2003

(86) PCT No.: PCT/JP03/14636

§ 371 (c)(1),
(2), (4) Date: Jul. 2, 2004

(87) PCT Pub. No.: WO2004/049666

PCT Pub. Date: Jun. 10, 2004

(65) Prior Publication Data

US 2005/0125552 A1 Jun. 9, 2005

(30) Foreign Application Priority Data

Nov. 26, 2002 (JP) .............................. 2002-342441

(51) Int. Cl.
G06F 15/173 (2006.01)
H04J 3/08 (2006.01)
H04L 12/56 (2006.01)

(52) U.S. Cl. .................. 709/223; 709/224; 709/227; 709/229; 709/245; 709/246; 370/315; 370/390; 370/393; 370/400; 370/464

(58) Field of Classification Search .................. 709/223, 709/224, 227–229, 245, 246; 370/315, 390–393, 370/400, 464
See application file for complete search history.

(56) References Cited

U.S. PATENT DOCUMENTS 4,922,503 A * 5/1990 Leone .......................... 370/402

(Continued)

FOREIGN PATENT DOCUMENTS

JP  0658837  6/1995

(Continued)

OTHER PUBLICATIONS

Jeffrey C. Mogul, et al., The Packet Filter: An Efficient Mechanism for User-Level Network Code; ACM Press, vol. 21, No. 5, 1987, pp. 39-51.

*Primary Examiner*—Saleh Najjar
*Assistant Examiner*—Farzana Huq
(74) *Attorney, Agent, or Firm*—Oblon, Spivak, McClelland, Maier & Neustadt, P.C.

(57) ABSTRACT

A device and method for autonomously deciding whether or not to execute data processing requests (commands) from other devices is provided. A rule mapping processor for determining whether or not to executed data processing based on data processing requests received from other devices is also provided. A determination is made at said rule mapping processor as to whether or not to execute data processing based on data transmission mode information for received data processing requests. Determination of execution or non-execution of autonomous processing is possible with this configuration so that in distributed data processing occurring at, for example, a P2P-connected network configuration etc., it is possible to eliminate procedures such as selection of nodes executing processing and therefore enable efficient data processing, packet transmission accompanying deciding of processing nodes can be reduced, and reduction of network traffic may also be made possible.

18 Claims, 15 Drawing Sheets

U.S. PATENT DOCUMENTS

| | | | |
|---|---|---|---|
| 5,515,513 A * | 5/1996 | Metzger et al. | 709/249 |
| 5,956,335 A * | 9/1999 | Backes et al. | 370/392 |
| 6,173,322 B1 * | 1/2001 | Hu | 709/224 |
| 6,567,851 B1 * | 5/2003 | Kobayashi | 709/228 |
| 6,587,456 B1 * | 7/2003 | Rao et al. | 370/352 |
| 6,718,387 B1 * | 4/2004 | Gupta et al. | 709/226 |
| 6,778,530 B1 * | 8/2004 | Greene | 370/389 |
| 6,922,724 B1 * | 7/2005 | Freeman et al. | 709/223 |
| 7,086,061 B1 * | 8/2006 | Joshi et al. | 718/105 |
| 7,254,138 B2 * | 8/2007 | Sandstrom | 370/412 |
| 2002/0194333 A1 * | 12/2002 | Baek et al. | 709/225 |
| 2003/0058880 A1 * | 3/2003 | Sarkinen et al. | 370/413 |
| 2003/0161299 A1 * | 8/2003 | Rao et al. | 370/352 |
| 2004/0013112 A1 * | 1/2004 | Goldberg et al. | 370/389 |
| 2004/0032856 A1 * | 2/2004 | Sandstrom | 370/351 |
| 2004/0039940 A1 * | 2/2004 | Cox et al. | 713/201 |

FOREIGN PATENT DOCUMENTS

| | | |
|---|---|---|
| JP | 2928725 | 5/1999 |
| JP | 2001-84199 | 3/2001 |
| JP | 2001-223716 | 8/2001 |
| JP | 2002-183045 | 6/2002 |

* cited by examiner

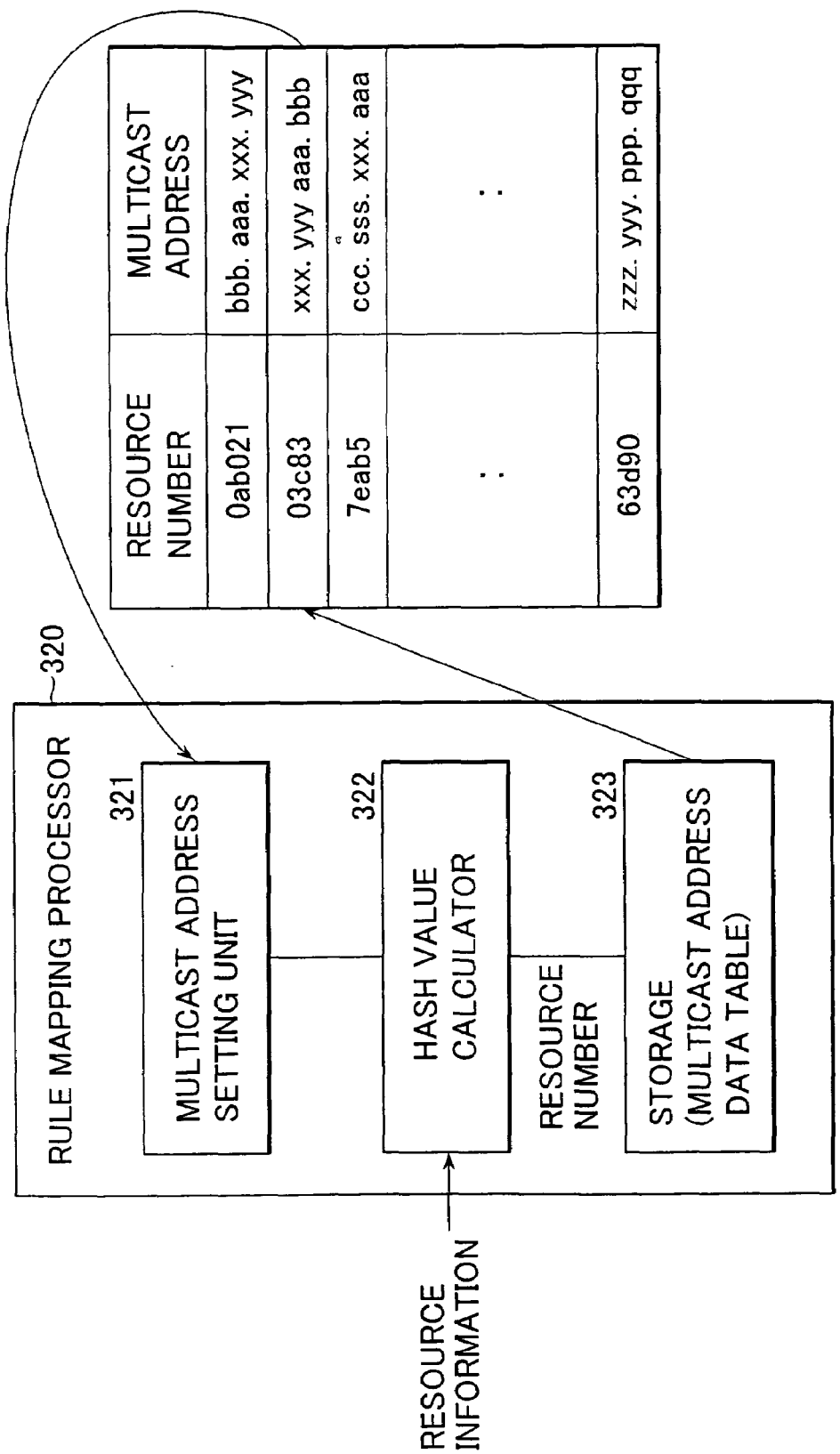

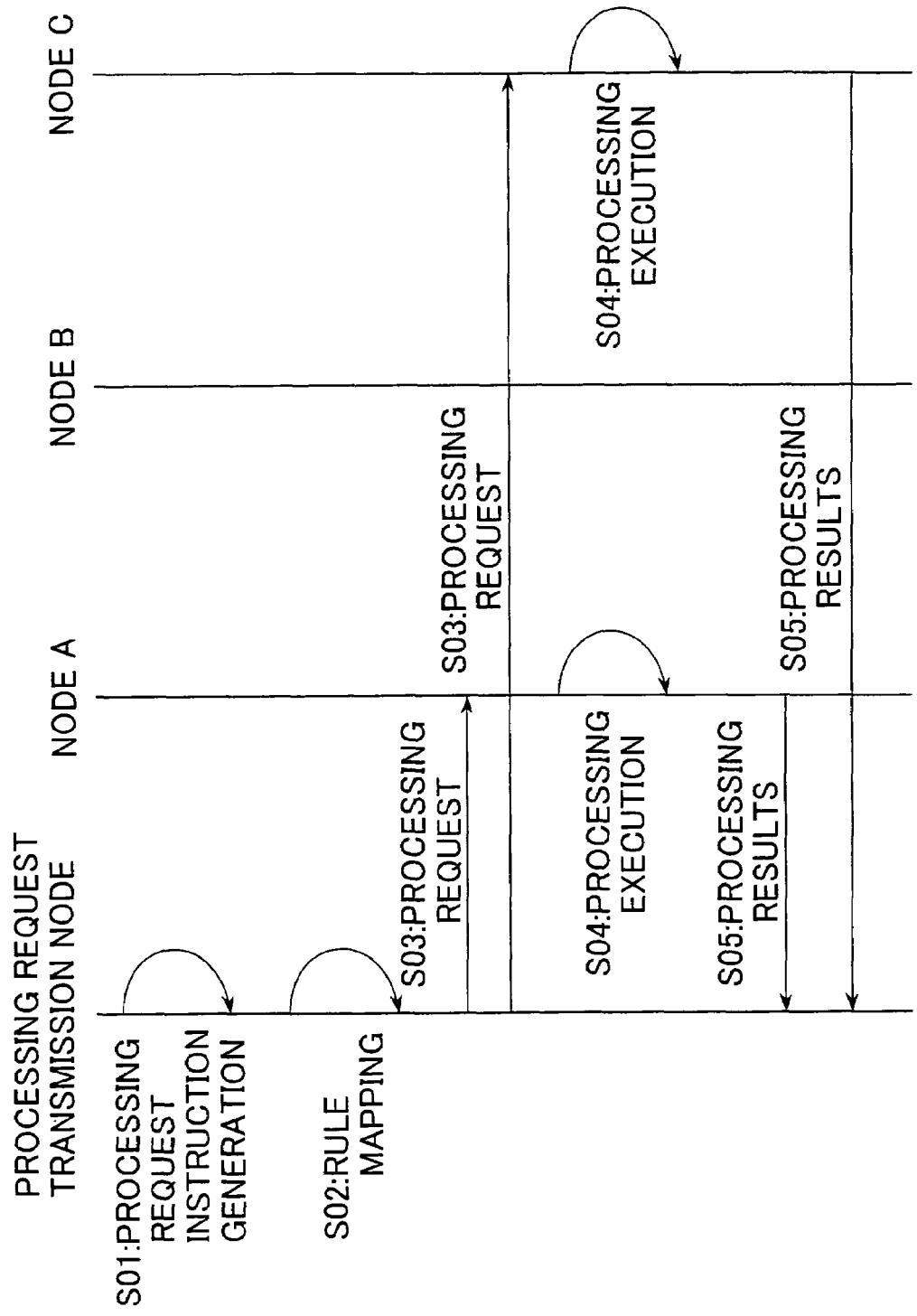

FIG.6

| (a) | (b) | (c) | (d) |
|---|---|---|---|
| UPPERMOST BIT OF LOWER FOUR BITS IS 0 | UPPERMOST TWO BITS OF LOWER FOUR BITS ARE 00 | UPPERMOST THREE BITS OF LOWER FOUR BITS ARE 000 | LOWER FOUR BITS ARE 0000 |
| | | UPPERMOST THREE BITS OF LOWER FOUR BITS ARE 001 | LOWER FOUR BITS ARE 0001 |
| | UPPERMOST TWO BITS OF LOWER FOUR BITS ARE 01 | UPPERMOST THREE BITS OF LOWER FOUR BITS ARE 010 | LOWER FOUR BITS ARE 0010 |
| | | UPPERMOST THREE BITS OF LOWER FOUR BITS ARE 011 | LOWER FOUR BITS ARE 0011 |
| | | | LOWER FOUR BITS ARE 0100 |
| | | | LOWER FOUR BITS ARE 0101 |
| | | | LOWER FOUR BITS ARE 0110 |
| | | | LOWER FOUR BITS ARE 0111 |
| UPPERMOST BIT OF LOWER FOUR BITS IS 1 | UPPERMOST TWO BITS OF LOWER FOUR BITS ARE 10 | UPPERMOST THREE BITS OF LOWER FOUR BITS ARE 100 | LOWER FOUR BITS ARE 1000 |
| | | UPPERMOST THREE BITS OF LOWER FOUR BITS ARE 101 | LOWER FOUR BITS ARE 1001 |
| | UPPERMOST TWO BITS OF LOWER FOUR BITS ARE 11 | UPPERMOST THREE BITS OF LOWER FOUR BITS ARE 110 | LOWER FOUR BITS ARE 1010 |
| | | UPPERMOST THREE BITS OF LOWER FOUR BITS ARE 111 | LOWER FOUR BITS ARE 1011 |
| | | | LOWER FOUR BITS ARE 1100 |
| | | | LOWER FOUR BITS ARE 1101 |
| | | | LOWER FOUR BITS ARE 1110 |
| | | | LOWER FOUR BITS ARE 1111 |

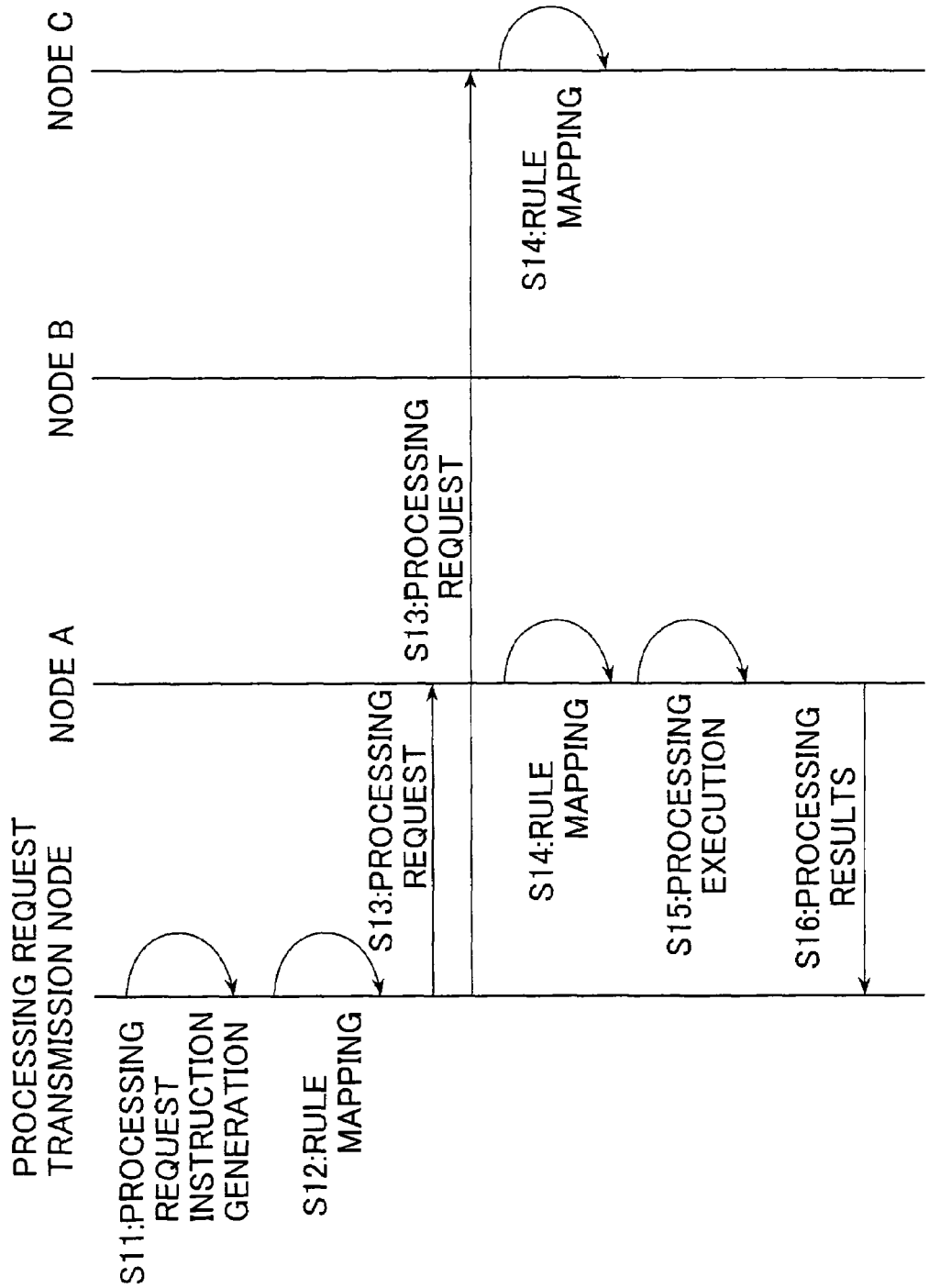

FIG.14

| COMMAND EXECUTION DEVICE ID | NETWORK IP ADDRESS | WIRELESS (FREQUENCY) | WIRELESS (CDMA) | HARD-WARE |
|---|---|---|---|---|
| GROUP 1 | | | | |
| UPPERMOST BIT OF LOWER FOUR BIT IS 0 | 224.200.0.0 | 5.00GHz | ENCODED SERIES 1 | BUS 1 |
| UPPERMOST BIT OF LOWER FOUR BIT IS 1 | 224.200.0.1 | 5.01GHz | ENCODED SERIES 2 | BUS 2 |
| GROUP 2 | | | | |
| UPPERMOST TWO BITS OF LOWER FOUR BITS ARE 00... | 224.200.1.0 | 5.02GHz | ENCODED SERIES 3 | BUS 3 |
| UPPERMOST TWO BITS OF LOWER FOUR BITS ARE 01... | 224.200.1.1 | 5.03GHz | ENCODED SERIES 4 | BUS 4 |
| UPPERMOST TWO BITS OF LOWER FOUR BITS ARE 10... | 224.200.1.2 | 5.04GHz | ENCODED SERIES 5 | BUS 5 |
| UPPERMOST TWO BITS OF LOWER FOUR BITS ARE 110... | 224.200.1.3 | 5.05GHz | ENCODED SERIES 6 | BUS 6 |
| GROUP 3 | | | | |
| UPPERMOST THREE BITS OF LOWER FOUR BITS ARE 000 | 224.200.2.0 | 5.06GHz | ENCODED SERIES 7 | BUS 7 |
| UPPERMOST THREE BITS OF LOWER FOUR BITS ARE 001 | 224.200.2.1 | 5.07GHz | ENCODED SERIES 8 | BUS 8 |
| UPPERMOST THREE BITS OF LOWER FOUR BITS ARE 010 | 224.200.2.2 | 5.08GHz | ENCODED SERIES 9 | BUS 9 |
| UPPERMOST THREE BITS OF LOWER FOUR BITS ARE 011 | 224.200.2.3 | 5.09GHz | ENCODED SERIES 10 | BUS 10 |
| UPPERMOST THREE BITS OF LOWER FOUR BITS ARE 100 | 224.200.2.4 | 5.10GHz | ENCODED SERIES 11 | BUS 11 |
| UPPERMOST THREE BITS OF LOWER FOUR BITS ARE 101 | 224.200.2.5 | 5.11GHz | ENCODED SERIES 12 | BUS 12 |
| UPPERMOST THREE BITS OF LOWER FOUR BITS ARE 110 | 224.200.2.6 | 5.12GHz | ENCODED SERIES 13 | BUS 13 |
| UPPERMOST THREE BITS OF LOWER FOUR BITS ARE 111 | 224.200.2.7 | 5.13GHz | ENCODED SERIES 14 | BUS 14 |
| GROUP 4 | | | | |
| LOWER FOUR BIT ARE 0000... | 224.200.3.0 | 5.14GHz | ENCODED SERIES 15 | BUS 15 |
| LOWER FOUR BIT ARE 0001... | 224.200.3.1 | 5.15GHz | ENCODED SERIES 16 | BUS 16 |
| LOWER FOUR BIT ARE 0010... | 224.200.3.2 | 5.16GHz | ENCODED SERIES 17 | BUS 17 |
| LOWER FOUR BIT ARE 0011... | 224.200.3.3 | 5.17GHz | ENCODED SERIES 18 | BUS 18 |
| LOWER FOUR BIT ARE 0100... | 224.200.3.4 | 5.18GHz | ENCODED SERIES 19 | BUS 19 |
| LOWER FOUR BIT ARE 0101... | 224.200.3.5 | 5.19GHz | ENCODED SERIES 20 | BUS 20 |
| LOWER FOUR BIT ARE 0110... | 224.200.3.6 | 5.20GHz | ENCODED SERIES 21 | BUS 21 |
| LOWER FOUR BIT ARE 0111... | 224.200.3.7 | 5.21GHz | ENCODED SERIES 22 | BUS 22 |
| LOWER FOUR BIT ARE 1000... | 224.200.3.8 | 5.22GHz | ENCODED SERIES 23 | BUS 23 |
| LOWER FOUR BIT ARE 1001... | 224.200.3.9 | 5.23GHz | ENCODED SERIES 24 | BUS 24 |
| LOWER FOUR BIT ARE 1010... | 224.200.3.10 | 5.24GHz | ENCODED SERIES 25 | BUS 25 |
| LOWER FOUR BIT ARE 1011... | 224.200.3.11 | 5.25GHz | ENCODED SERIES 26 | BUS 26 |
| LOWER FOUR BIT ARE 1100... | 224.200.3.12 | 5.26GHz | ENCODED SERIES 27 | BUS 27 |
| LOWER FOUR BIT ARE 1101... | 224.200.3.13 | 5.27GHz | ENCODED SERIES 28 | BUS 28 |
| LOWER FOUR BIT ARE 1110... | 224.200.3.14 | 5.28GHz | ENCODED SERIES 29 | BUS 29 |
| LOWER FOUR BIT ARE 1111... | 224.200.3.15 | 5.29GHz | ENCODED SERIES 30 | BUS 30 |

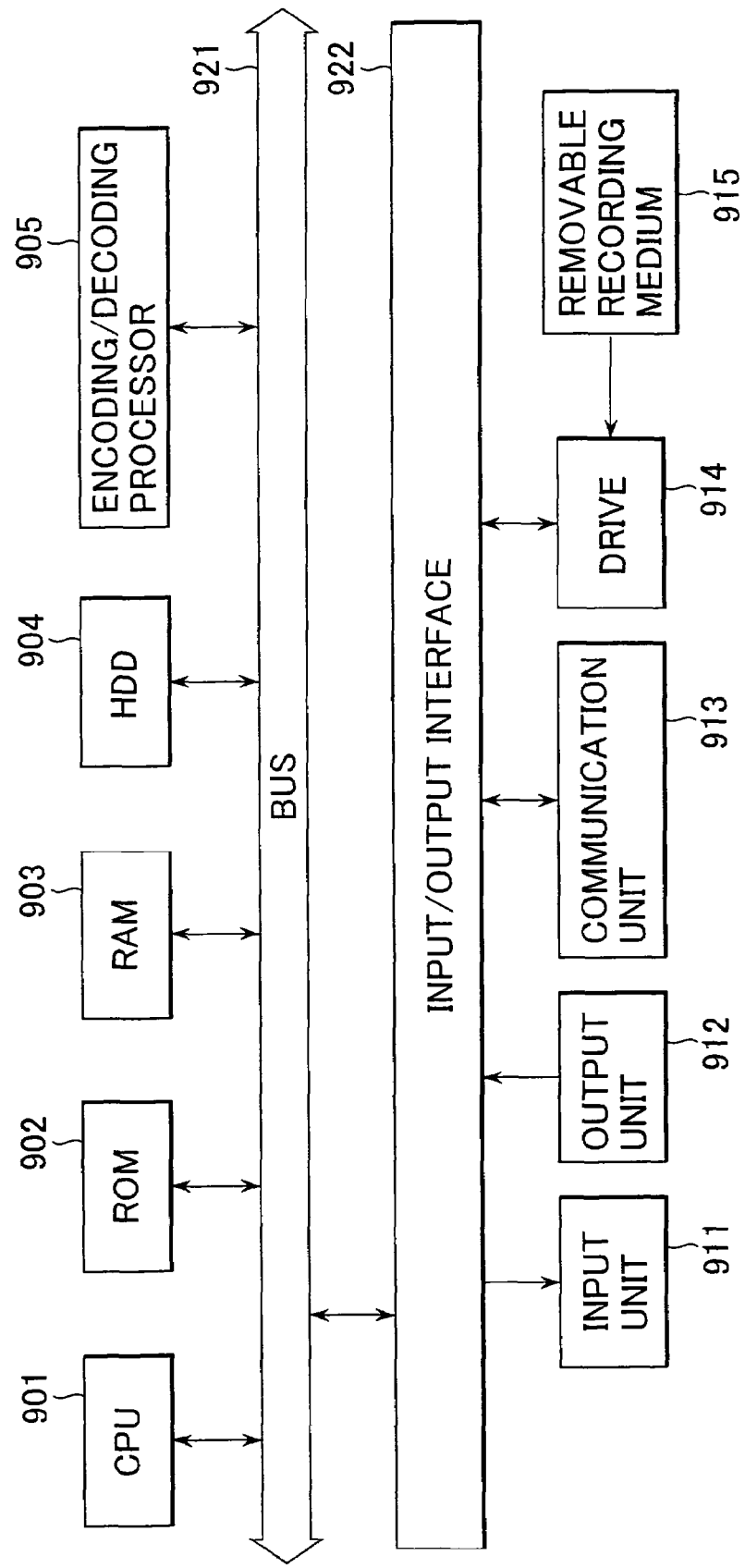

INFORMATION PROCESSING DEVICE, INFORMATION PROCESSING METHOD, AND COMPUTER PROGRAM

TECHNICAL FIELD

The present invention relates to an information processing device, information processing method, and computer program. More specifically, the present invention relates to an information processing device, information processing method, and computer program for efficiently implementing data processing applied to a plurality of information processing devices connected by a network etc.

BACKGROUND ART

In recent years, various information processing devices such as, for example, personal computers (PCs), large-scale computers, servers, and other communication equipment have been connected to communication networks such as the Internet in order to transfer content such as, audio data, or various programs etc., or transfer various processed data between each item of network-connected equipment. The type of content exchanged over a network is shifting from text and still images etc. to multimedia content such as moving pictures and audio, with the volume of the content also advancing remarkably.

Moreover, in recent years, Peer-to-Peer (P2P: Peer-to-Peer) technology has been developed and utilized as processing for direct communication between information processing devices. Rather than installing a server for performing processing in a centralized manner, a P2P network is a configuration for enabling various equipment such as, for example, PCs, mobile terminals, PDAs, mobile telephones, disc devices taken as storage having functions enabling communication processing or being connected to communication equipment, or printers etc. that are information processing devices taken as resources possessed by each network client to communicate via a network by enabling the resources possessed by each network client to be shared.

The technology used in APPN (Advanced Peer to Peer Networking) put forward by IBM Corporation (USA) is considered the first appearance of the Peer-to-Peer (P2P: Peer-to-Peer) network technology. By using this network, it is no longer necessary to install immense distribution servers required in the case of distributing content over a client-server network as in the related art, and content distributed across resources possessed by each network client can be utilized by a large number of users so as to enable storage and distribution of a large capacity of content.

There are two types of Peer-to-Peer (P2P: Peer-to-Peer) networks, Pure Peer-to-Peer networks, and Hybrid Peer-to-Peer networks.

A Pure Peer-to-Peer network is a form of network where each configuration element (Peer) of the system possesses equal functions and roles, and carry out communication equally. Gnutella can be given as a typical service employing this approach. A Hybrid Peer-to-Peer network, in addition to a Pure Peer-to-Peer network, is a form of network employing a control server in order to make interaction between each configuration element (Peer) of a system smooth. Napster can be given as a typical service employing this approach.

In a Hybrid Peer-to-Peer method as typified by Napster, when a network-connected terminal is to acquire content, first, a search is made by a central server for content resources. The terminal then accesses a node (another network-connected terminal) in possession of a resource based on the search information and acquires content. In this method, it is necessary to register resource information for all of the nodes on the central server, and this has the drawback that the search is concentrated on a central server.

A method has therefore been proposed to execute processing such as resource searches etc. in a manner distributed across a plurality of devices. This distributed processing method is managed by a method such as arranging devices determining processing execution in a tree relationship etc. so that processing such as resource searching etc. is executed distributed over a plurality of devices based on management information. However, with this method, when the number of devices executing the processing becomes large, such as a few hundred, the amount of information for managing the tree configuration increases, the number of processing commands for transmitting execution commands to the plurality of processing devices increases, and tree integrity may be compromised. Further there is also a problem that processing delays occur because determination processing by a plurality of processing execution determination devices is required.

In order to compensate for this shortcoming, a method is provided where all commands are sent to all network-connected nodes, with a determination then being made at each node as to whether to execute the received processing command or not. This is a Pure Peer-to-Peer method typified by Gnutella. This method is configured differently to the Hybrid Peer-to-Peer method in that there is no central server for executing resource search processing, but rather the configuration is such that search requests are transmitted and received and resource searches executed directly between each node, with processing requests for transmission of content etc. then being made to hit terminals.

With Pure Peer-to-Peer methods typified by Gnutella also, a configuration where searches can be carried out for all or as large a number of the nodes as possible by using routing such as tree configuration and network configuration etc. in the transfer of search commands is effective. However, with this method, a load is put upon the transmission path as a result of executing command transfer processing of processing commands that are not executed at an own node.

For example, complex routing management is required in order to search all network-connected nodes to enable processing requests to reach all nodes. On the other hand, when best effort method node searching is executed, it cannot be guaranteed that commands will be transmitted to all nodes, and there may also be cases where the necessary resources cannot be found. Further, the network may become congested when communication for node searches occurs frequently.

DISCLOSURE OF INVENTION

In order to resolve the problems described above, it is the object of the present invention to provide an information processing device, information processing method, and computer program enabling various data processing such as, for example, content transfer processing etc. to be executed effectively utilizing a plurality of network-connected nodes in a configuration where a plurality of terminals (nodes) are connected to a network and enable distributed processing to be executed in such a manner that increases in network traffic due to transfer of large volumes of packets is suppressed.

Further, it is an object to provide an information processing device, information processing method, and computer program capable of enabling various data processing to be executed in an effective manner at devices or equipment in an efficient manner even for wireless communication devices or electronic circuits etc.

In a first aspect of the present invention an information processing device is characterized by:

a data receiver;

a rule mapping processor for determining whether or not to execute data processing based on a data processing request received via the data receiver; and a data processor for executing data processing based on a determination of the rule mapping processor, wherein the rule mapping processor carries out processing to determine whether or not to execute data processing corresponding to the received data processing request based on data transmission mode information for the data processing request received via the data receiver.

Further, an embodiment of the information processing device of the present invention is characterized by the rule mapping processor carrying out processing to determine whether or not to execute data processing corresponding to the received data processing request based on a comparison of a value stored in the data processing request received via the data receiver and a generated random number.

Moreover, an embodiment of the information processing device of the present invention is characterized by the rule mapping processor carrying out processing to determine whether or not to execute data processing corresponding to the received data processing request based on a comparison of a hash value for a value stored in the data processing request received via the data receiver and a preset threshold value.

Further, in an embodiment of the information processing device of the present invention, the rule mapping processor comprises a multicast address data table correlating receiving node rates and multicast address data, compares an address extracted from the multicast address data table based on a command receiving rate set at an own-device and an address set for a data processing request received via the data receiver, and carries out processing to determine whether or not to execute data processing based on the comparison results.

Moreover, in an embodiment of an information processing device of the present invention, the rule mapping processor comprises a multicast address data table correlating resource numbers and multicast address data, and calculates a hash value based on resource information stored in the data processing request received via the data receiver, determines whether or not the hash value and a setting address of the data processing request match with corresponding items in the table, and carries out processing to determine whether or not to execute data processing based on the determination.

Still further, in an embodiment of the information processing device of the present invention, the information processing device is a wireless communication device, and the rule mapping processor is configured so as to carry out processing to determine whether or not to execute data processing based on information of at least one of setting information for the receiving frequency, bandwidth, and/or encoding sequence of a data processing request received from another wireless communication device.

Moreover, in an embodiment of the information processing device of the present invention, the information processing device is a device constituted by an electronic circuit, and the rule mapping processor is configured so as to carry out processing to determine whether or not to execute data processing based on information of at least one of setting information for an input bus or address of a data processing request inputted from another device.

Further, in a second aspect of the present invention an information processing device is characterized by:

a data transmitter;

a rule mapping processor for deciding upon a transmission mode of a data processing request transmitted via the data transmitter; and a data processor for executing setting of transmission data mode based on the decision occurring at the rule mapping processor, wherein the rule mapping processor is configured so as to carry out data transmission mode deciding processing based on rules decided in advance at respective transmitted data processing requests.

Further, in an embodiment of the information processing device of the present invention, the rule mapping processor comprises a multicast address data table correlating receiving node rates and multicast address data, extracts a multicast address from the multicast address data table in accordance with a value set based on the transmitted data processing request, and decides upon the address as the setting address for the transmitted data processing request.

Moreover, in an embodiment of the information processing device of the present invention, the rule mapping processor comprises a multicast address data table correlating resource numbers and multicast address data, takes a hash value for a value corresponding to the transmitted data processing request as a resource number, extracts a multicast address set corresponding to a hash value from the multicast address data table in accordance with a value set based on the transmitted data processing request, and decides upon the address as the setting address for the transmitted data processing request.

Further, in an embodiment of the information processing device of the present invention, the information processing device is a wireless communication device, and the route mapping processor carries out setting processing for at least one of frequency, bandwidth, and encoding sequence based on rule mapping information set in advance for respective data processing requests sent to other wireless communication devices.

Moreover, in an embodiment of the information processing device of the present invention, the information processing device is a device constituting an electronic circuit, and the route mapping processor carrying out setting processing for at least one of the output bus and address based on rule mapping information set in advance for respective data processing requests outputted to other devices.

Further, in a third aspect of the present invention an information processing method is characterized by:

a data receiving step;

a rule mapping processing step of determining whether or not to execute data processing based on a data processing request received in the data receiving step; and a data processing step of executing data processing based on a determination of the rule mapping processing step, wherein the rule mapping processing step includes a step of carrying out processing to determine whether or not to execute data processing corresponding to the received data processing request based on data transmission mode information for the received data processing request.

Further, an embodiment of the information processing method of the present invention is characterized by the rule mapping processing step carrying out processing to determine whether or not to execute data processing corresponding to the received data processing request based on a comparison of a value stored in the data processing request and a generated random number.

Further, an embodiment of the information processing method of the present invention is characterized by the rule mapping processing step carrying out processing to determine whether or not to execute data processing corresponding to the received data processing request based on a comparison of a hash value for a value stored in the data processing request and a preset threshold value.

Further, an embodiment of the information processing method of the present invention is characterized by the rule mapping processing step comparing an address extracted from a multicast address data table correlating receiving node rates and multicast address data based on a command receiving rate set at an own-device and an address set for the data processing request, and carries out processing for determining whether or not to execute data processing based on results of the comparison.

Further, an embodiment of the information processing method of the present invention is characterized by the rule mapping processing step calculating a hash value based on resource information stored in the data processing request, and making the calculated hash value and the address set for the data processing request correspond; and determining whether or not matching exists with correspondence of the multicast address data table making the resource number and the multicast address data correspond, and carrying out processing for determining whether or not to execute data processing based on the determination.

Moreover, an embodiment of the information processing method of the present invention is characterized by the rule mapping processing step being configured so as to carry out processing to determine whether or not to execute data processing based on information of at least one of setting information for the receiving frequency, bandwidth, and/or encoding sequence of a data processing request received from another wireless communication device.

Still further, an embodiment of the information processing method of the present invention is characterized by the rule mapping processing step being configured so as to carry out processing to determine whether or not to execute data processing based on information of at least one of setting information for an input bus or address of a data processing request inputted from another device.

Further, in a fourth aspect of the present invention an information processing method is characterized by:

a rule mapping processing step of deciding upon a transmission mode of a transmitted data processing request; and a data processing step of executing setting of transmission data mode based on the decision occurring in the rule mapping processing step, wherein the rule mapping processing step is configured so as to carry out data transmission mode deciding processing based on rules decided in advance at respective transmitted data processing requests.

Moreover, an embodiment of the information processing method of the present invention is characterized by the rule mapping processing step extracting a multicast address from the multicast address data table correlating receiving node rates and multicast address data in accordance with a value set based on the transmitted data processing request, and deciding upon the extracted address as a setting address for the transmitted data processing request.

Still further, an embodiment of the information processing method of the present invention is characterized by the rule mapping processing step calculating a hash value for a value corresponding to the transmitted data processing request, extracting a multicast address correlated to a resource number matching with a calculated hash value from the multicast address data table correlating resource numbers and multicast address data, and deciding upon the extracted address as a setting address for the transmitted data processing request.

Still further, an embodiment of the information processing method of the present invention is characterized by the rule mapping processing step carrying out setting processing for at least one of frequency, bandwidth, and encoding sequence based on rule mapping information set in advance for respective data processing requests sent to other wireless communication devices.

Moreover, an embodiment of the information processing method of the present invention is characterized by the rule mapping processing step carrying out setting processing for at least one of output bus and address based on rule mapping information set in advance for respective data processing requests outputted to other devices.

Further, in a fifth aspect of the present invention, a computer program for executing processing with respect to received data is characterized by:

a rule mapping processing step of determining whether or not to execute data processing based on a data processing request; and a data processing step of executing data processing based on a determination of the rule mapping processing step, wherein the rule mapping processing step includes a step of carrying out processing to determine whether or not to execute data processing corresponding to the received data processing request based on data transmission mode information for the received data processing request.

Moreover, in a sixth aspect of the present invention, a computer program for executing processing with respect to transmitted data is characterized by:

a rule mapping processing step of deciding upon a transmission mode of a transmitted data processing request; and a data processing step of executing setting of transmission data mode based on the decision occurring in the rule mapping processing step, wherein the rule mapping processing step includes a step of carrying out data transmission mode deciding processing based on rules decided in advance at respective transmitted data processing requests.

According to the configuration of the present invention, a rule mapping processor for determining whether or not to execute data processing based on data processing requests received from other devices is provided, and at the route mapping processor, processing is carried out to determine whether or not to execute data processing corresponding to received data processing requests based on data transmission information for data processing requests received via the data receiver. Determination of execution or non-execution of autonomous processing is possible with this configuration so that in distributed data processing occurring at, for example, a P2P-connected network configuration etc., it is possible to eliminate procedures such as selection of nodes executing processing and therefore enable efficient data processing, packet transmission accompanying deciding of processing nodes can be reduced, and reduction of network traffic may also be made possible.

According to this configuration, processing is carried out to determine whether or not to execute data processing based on comparisons of values stored in data processing requests and generated random numbers, or comparisons of hash values for values stored in data processing requests and preset threshold values. This enables still greater control of selection of data processing at the information processing device receiving data processing requests.

Further, according to the configuration of the present invention, the rule mapping processor comprises a multicast address data table correlating receiving node rates and multicast address data, and is capable of comparing an address extracted from the multicast address data table based on a command receiving rate set at an own-device and an address set for a data processing request received via the data receiver, and carrying out processing to determine whether or not to execute data processing based on the comparison results.

Moreover, according to the configuration of the present invention, the rule mapping processor comprises a multicast address data table correlating resource numbers and multicast address data, and is capable of calculating a hash value based on resource information stored in the data processing request received via the data receiver, determining whether or not the hash value and a setting address of the data processing request match with corresponding items in the table, and carrying out processing to determine whether or not to execute data processing based on the determination.

According to the configuration of the present invention, in the case of wireless communication devices, it is possible to carry out processing to determine whether or not to execute data processing based on information of at least one of setting information for the receiving frequency, bandwidth, and/or encoding sequence of a data processing request. Further, in the case of devices constituted by electronic circuits, it is possible to carry out processing to determine whether or not to execute data processing based on information of at least one of setting information for an input bus or address of a data processing request inputted from another device, and this enables control of data processing where the processing load is distributed to be executed efficiently.

The computer program of the present invention is capable of being provided, for example, using storage media for providing various program codes in a computer-readable format to general purpose computer system capable of executing these codes, communication media, recording media such as, for example, CDs and FDs, or MOs etc., or using communication media such as networks, etc.

It is therefore possible to implement processing according to programs on a computer system by providing these programs in a computer-readable format.

Further objects, features and advantages of the present invention will become clear from the following detailed description based on embodiments of the present invention and the appended drawings.

Moreover, the system in this specification is a configuration where a plurality of devices are logically collected together, and is by no means limited to each device of the configuration being in the same case.

BRIEF DESCRIPTION OF DRAWINGS

FIG. 4 is another view illustrating a configuration for a rule mapping processor and storage table of an information processing device of the present invention.

FIG. 5 is a view illustrating a communication processing sequence relating to network-connected information processing devices.

FIG. 6 is a view illustrating an example of grouping processing for an information processing device. FIG. 7 is a view illustrating a communication processing sequence relating to network-connected information processing devices.

FIG. 14 is a view illustrating various grouping processing examples for an information processing device.

FIG. 15 is a view illustrating a hardware configuration example for the information processing device of the present invention.

BEST MODES FOR CARRYING OUT THE INVENTION

In the following, a detailed description is given with reference to the drawings of the information processing device, information processing method, and computer program of the present invention.

[Network System Configuration Example]

Figure 1:
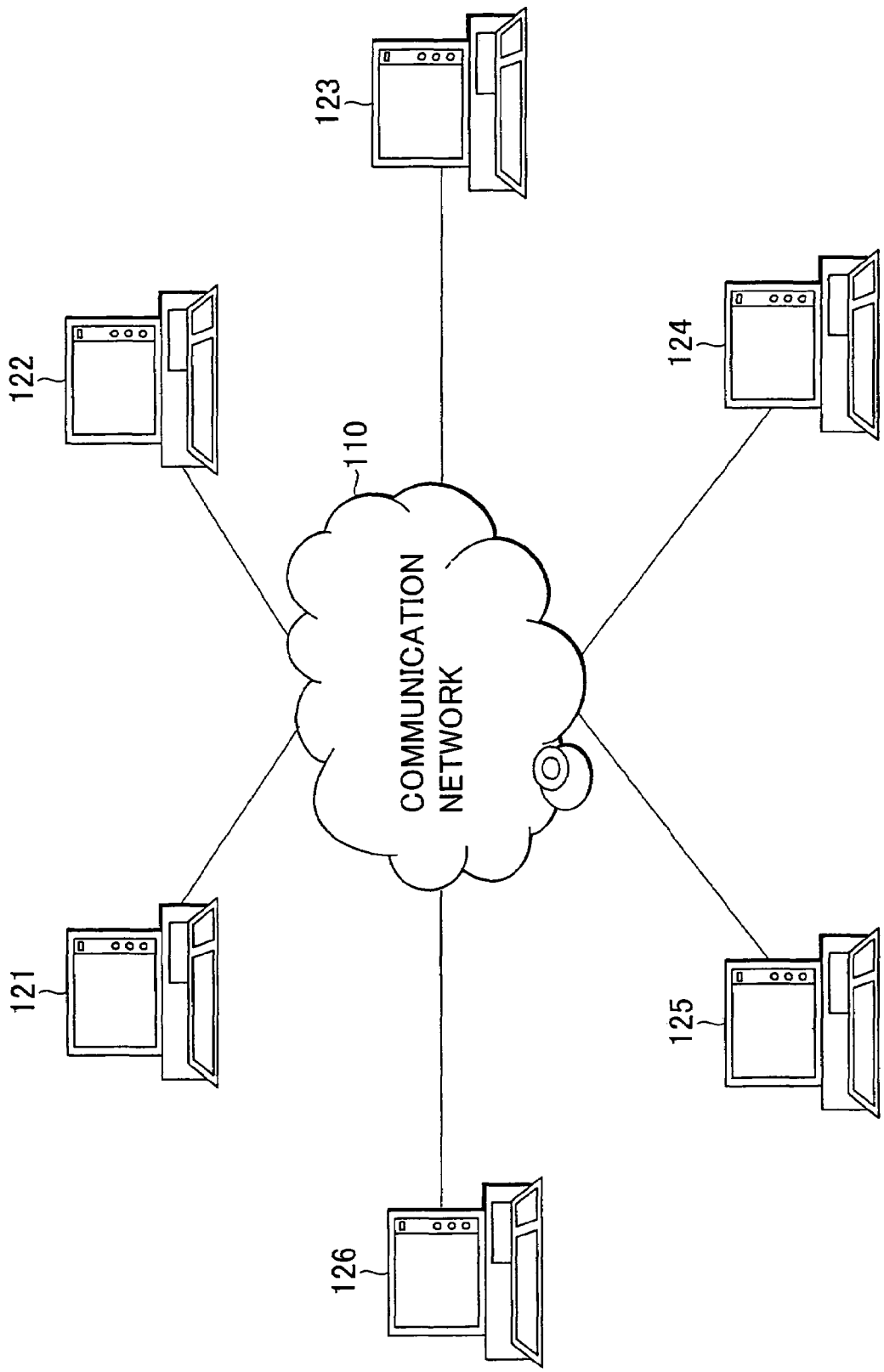
FIG. 1 is a view illustrating an example network configuration to which application of the present invention is possible.

First, a description is given with reference to FIG. 1 of an example configuration of a network for implementing data processing to which the information processing device of the present invention is applied.

The information processing device has a configuration capable of communication with other information processing devices and is connected by a communication network.

Basically, the network is a Pure Peer-to-Peer network that does not have a control server taken as a Look-up Server.

As shown in FIG. 1, each information processing device 121 to 126 communicates with each other via a network 110 and implements various data processing such as processing for transmitting and reviewing content etc.

The present invention is also capable of being applied to a Hybrid Peer-to-Peer network in which a control server is present, is not limited to being applied to any particular kind of network configuration, and any configuration where communication is possible between information processing devices is appropriate.

[Information Processing Device Configuration and Processing]

Next, an information processing device of the present invention, i.e. a configuration for an information processing device that mutually executes data communication such as mutual data processing requests or data processing results etc. is described with reference to FIG. 2.

Functions possessed by each of the network-connected information processing devices 121 to 126 shown in FIG. 1 are described with reference to the block diagram shown in FIG. 2.

Figure 2:
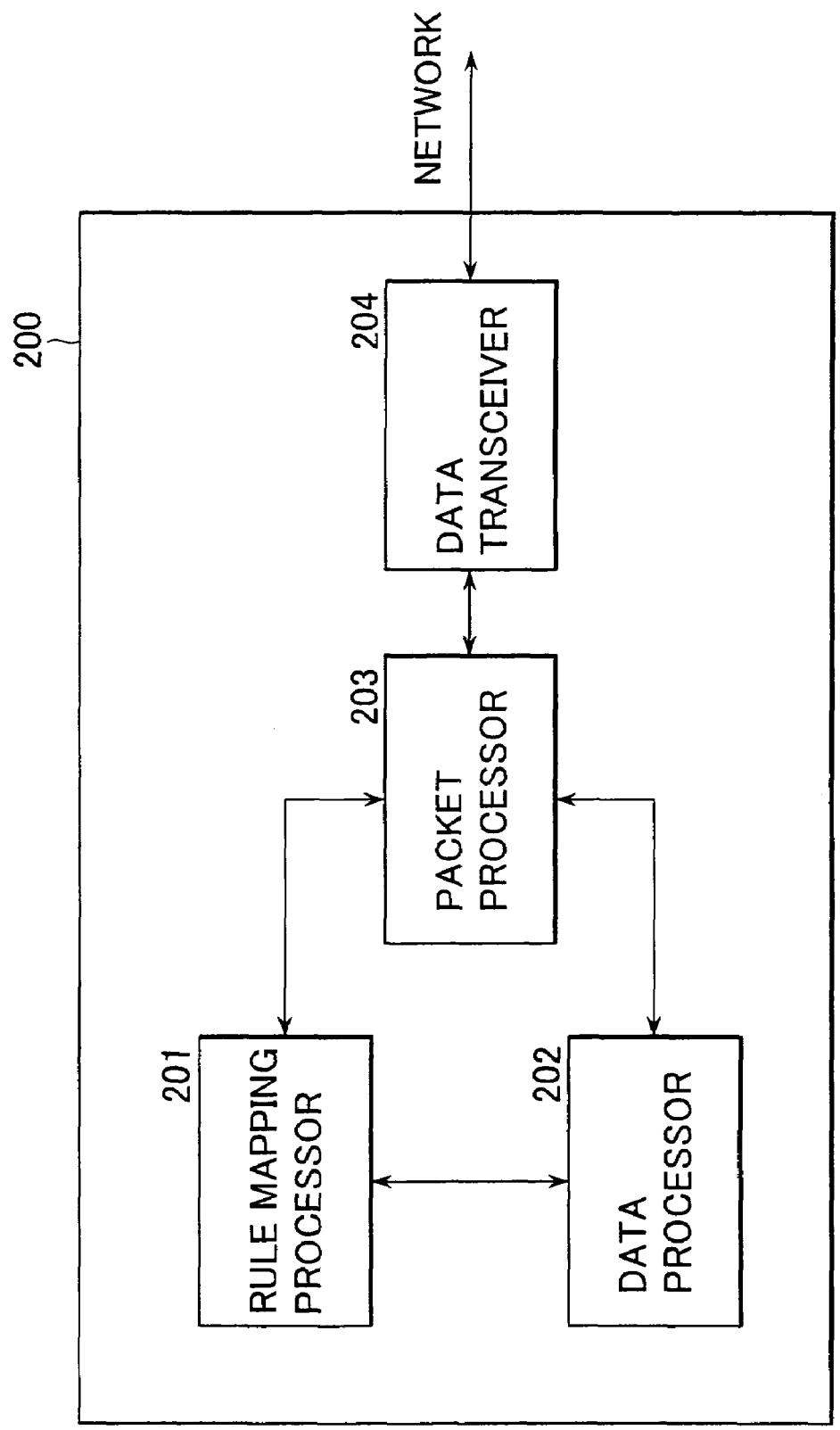
FIG. 2 is a view illustrating a configuration for an information processing device connected to a network.

An information processing device 200 shown in FIG. 2 comprises a rule mapping processor 201, data processor 202, packet processor 203, and data transceiver 204.

The data transceiver 204 executes processing to output transmitted packets to other information processing devices connected via the network and input received packets from other information processing devices.

The packet processor 203 carries out processing to generate packets transmitted to other network-connected information processing devices from an own-device or carries out processing to analyze packets received from other information processing devices, etc.

The data processor 202 executes processing according to data processing programs stored in respective information processing devices.

For example, if there is data processing, for example, a content transmission request, based on a data processing request from another network-connected information processing device, this is processing to extract the designated content from storage (not shown) and output this content to the packet processor 203, etc.

The rule mapping processor 201 is a processor for executing processing specific to the information processing device of the present invention, and basically executes the following two determination processes.

(1) Processing to determine whether or not to execute (command execution) data processing in accordance with a data processing request at an own-device based on a data processing request (command) packet received from other information processing devices.

(2) Executing setting processing, for example, for deciding a setting address for a data processing request (command) packet, for a data processing request (command) sent from an own-device to another information processing device. In other words, a data processing request destination is decided.

Summarizing, if a request is made, the processing of (1) described above is processing for deciding whether or not an own-device accepts or rejects a request from another device, and the processing of (2) is processing for deciding whether or not a data processing request from an own-device is sent to which information processing device that is network-connected, etc. When a data processing request is received from another information processing device, the rule mapping processor 201 determines whether or not to execute data processing at its own-device using the processing of (1), and when it is determined that execution is to take place, data processing such as, for example, extracting content from storage means, or other data processing, is executed at the data processor 202 in accordance with the processing request.

Further, when a data processing request from an own-device is transmitted to another information processing device, at the rule mapping processor 201, a decided address is outputted to the packet processor 203 after executing output setting processing such as, for example, address deciding processing, for the processing request. At the packet processor 203, a packet with the decided address set as header information and storing the data processing request is generated and outputted to the network via the data transceiver 204.

Various data processing execution commands such as programs for the execution of content data recording processing, data playback processing, and other data processing etc., and various processing requests and commands accompanying message communication such as RPC (Remote Procedure call) and ORB (Object Request Broker) etc. are contained in the data processing requests (commands) transmitted and received between the information processing devices of the present invention.

[Processing at the Rule Mapping Processor]

Next, a detailed description is given of processing occurring at the rule mapping processor 201 possessing the information processing device.

Figure 3:
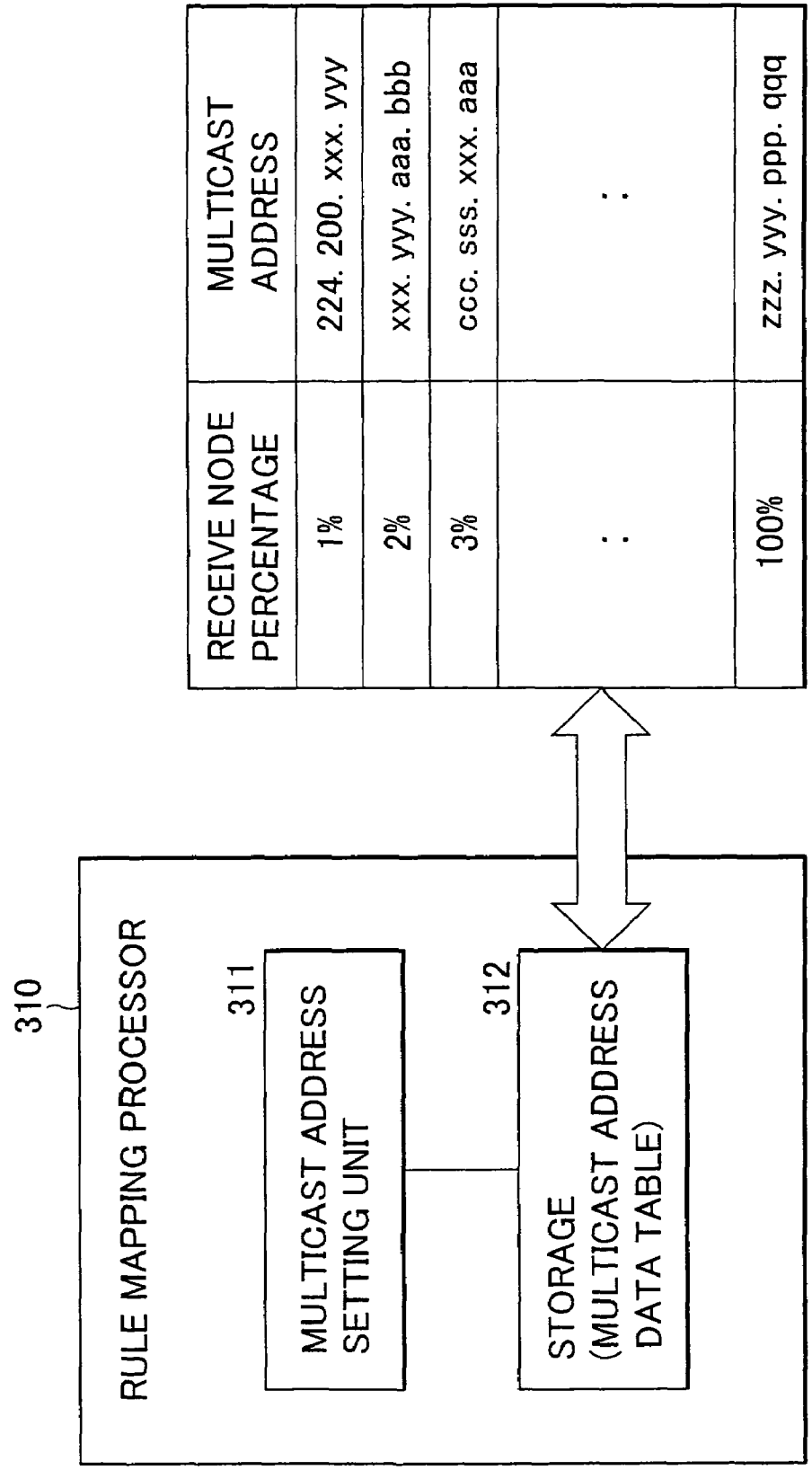
FIG. 3 is a view illustrating a configuration for a rule mapping processor and storage table of an information processing device of the present invention.

First, a description is given with reference to FIG. 3 of an example taken as a first specific example of processing where data processing requests (commands) are sent only to information processing devices selected from a large number of network-connected information processing devices, where multicast addresses are set with respectively difference rates for the information processing devices (nodes) receiving the data processing request (command) transmission packets.

As shown in FIG. 3, a rule mapping processor 310 is comprised of a multicast address setting unit 311, and storage 312 for storing a multicast address data table. As shown in the drawings, a multicast address data table is a table for storing multicast addresses set every receiving node rate (1% to 100%) in a correlated manner.

In other words, execution of packet transmission applied to multicast addresses [224.200.xxx.yyy] of receiving node rate of 1% means that packets are received at 1% of the information processing devices of the network-connected information processing devices.

Information processing devices connected to the network are set with receive probabilities for each data processing request (command). For example, if a node A is set to a receiving rate of 30%, when packets are transmitted using the multicast addresses of receiving node rate of 30% or more in the table shown in FIG. 3, the packets are received, but when a packet is transmitted using a multicast address of 29% or less, the packet is not received.

At the multicast address setting unit 311 of the rule mapping processor 310, an information processing device intending to transmit a data processing request (command) and execute data processing sets the receiving node rate according to a transmitted data processing request (command), a multicast address data table stored in the storage 312 is searched, and a multicast address corresponding to the receiving node rate is extracted. The packet processor 203 (refer to FIG. 2) generates a packet set with the decided multicast address and transmits this packet via the data transceiver 204.

At the multicast address setting unit 311, if, for example, the data processing request is a content transmission request, processing for setting receiving node rate according to the transmitted data processing request (command) takes estimation data for an information processing device possessing content as a content identifier (content ID) and content management information as an input value, and executes receiving node rate deciding processing based on this inputted data. Alternatively, when a data processing request to which a prescribed program has been applied is carried out, the receiving node rate deciding processing is executed based on distribution information data of the information processing device possessing the program executing this data processing request and program identification information.

At the rule mapping processor, in this way, a receiving node rate is decided while transmitting the data processing request (command) packet transmitted to the network, and packet transmission is executed with the multicast address set according to the decided receiving node rate. By using this processing, a proportion of network-connected nodes (information processing devices) corresponding to the set receiving node rate receive the data processing request packet, and the requested data processing is only executed at nodes (information processing devices) that received the packet.

Next, with reference to FIG. 4, a description is given of an example of processing taken as a second specific processing example, where various resource information such as, for example, computing power based on processor performance of a CPU etc., storage capacity of a storage device, or functions for transmitting to and from a network is gathered for resources of a network-connected information processing device, a resource number is set based on this resource information, and a transmission destination is set for the data processing request (command) based on a table correlating the multicast addresses to each resource number.

An example is described where a hash function is applied set at the resource number based on various resource information such as computing power based on processor performance of a CPU etc., storage capacity of a storage device, or a network transceiver function.

When a hash function is used, a hash value is calculated using arithmetic processing applying a hash function to an identifier (ID) set corresponding to various resource information such as computing power based on processor performance of the CPU etc., storage capacity of the storage device, or a network transceiver function, etc.

A multicast address is set every resource number or every resource number group.

A description is given of a specific processing example with reference to FIG. 4. At the multicast address setting unit 321 of the rule mapping processor 320, an information processing device intending to transmit a data processing request (command) and execute data processing executes processing for setting the multicast address according to the data processing request (command) to be transmitted. First, at a hash value calculator 322, an identifier (ID) set corresponding to the resource information is inputted, and arithmetic processing to which the hash function is applied is executed.

For example, when a CPU of 2 GHz or more, and a storage capacity of 200 GBytes or more is required as a resource required to execute a data processing request (command) it is intended to send, the hash value calculator 322 inputs resource identifiers: aabbxxx001 for which setting is complete for resources satisfying these conditions, calculates this hash value, and calculates a resource number. For example, when a resource number [03c83] is calculated, the multicast address data table stored in the storage 323 is searched, and a multicast address [xxx.yyy.aaa.bbb] corresponding to the resource number is extracted. The packet processor 203 (refer to FIG. 2) generates a packet set with the decided multicast address and transmits this packet via the data transceiver 204.

Information processing devices receiving the data processing request packet by the multicast address [xxx.yyy.aaa.bbb] corresponding to the resource number are information processing devices having the necessary resources for executing the data processing request (command) intended for transmission, i.e. CPU: 2 GHz or more, storage capacity: more than 200 GBytes, and are capable of executing the data processing request.

In this way, a hash value for an identifier (ID) set in a correlating manner at the resource information is set as a value coinciding with a resource number made to correspond to the multicast address for information processing devices having these resources. It is therefore possible for the information processing device transmitting the command to automatically select the most appropriate information processing devices and transmit the data processing request without sequentially interrogating resource information such as processing performance etc. of other network-connected information processing devices.

[Data Processing Request (Command) Transmission Sequence]

Next, a description is given with reference to FIG. 5 of a sequence for transmitting data processing requests, data processing and processing for receiving results of the data processing via the network of the information processing devices of the present invention.

In the drawing, processing occurring at four network-connected information processing devices is shown, with the left end being an information processing device carrying out the data processing request, and the remaining parts of the drawing showing processing for nodes selected as nodes receiving the data processing request or nodes that are not selected.

First, in step S01, the processing request transmitting node generates a processing request command. The processing request command may be, for example, a content transmission command designating content ID, or a data processing request command resulting from the execution of a specific arithmetic processing program.

Next, in step S02, the processing request transmitting node executes rule mapping processing. This is processing occurring at the rule mapping processor described above, and may be processing setting a multicast address according to the receiving node rate, or may be processing setting a multicast address corresponding to a resource number calculated using a hash value based on the resource information.

Next, in step S03, the process request transmitting node outputs a packet set with a multicast address decided by the rule mapping to the network. This set multicast address is only received by specific nodes. In the example shown in the drawing, only node A and node C receive the packet, and node B does not receive the packet.

In step S04, node A and node C that receive the data processing request packet execute data processing based on the processing request, and in step S05, the data processing results are sent to the processing request node.

[Information Processing Device Grouping]

In the above example, a description is given of a configuration where a data processing request (command) is sent to specifically selected nodes (information processing devices) by applying a multicast address. However, it is necessary to carry out precise grouping processing for each node in order to set multicast addresses for executing transmission of data processing request packets to nodes of, for example, 10%. The following is a description of a detailed example of this grouping processing.

FIG. 6 is a view illustrating an example of setting node identifiers (node IDs) at each information processing device and grouping according to node ID. Node IDs of multiple digits are allocated to each information processing device.

The example shown in FIG. 6 takes note of just the lowermost four digits of the node ID, with each information processing device (node) being grouped together according to the values of the lower four digits. First, field (a) is divided into two sections according to whether the uppermost digit of the lower four digits is 0 or 1, field (b) is divided into four sections according to whether the upper two digits are any one of 00, 01, 10 or 11, field (c) is divided into 8 sections according to the values of the upper three digits, and finally field (d) is divided into 16 sections according to the values of the four digits.

As a result of this processing, it is possible to divide up the whole into groups of numbers of halves, quarters, eighths, or sixteenths. For example, when it is wished to execute a command at a rate of half of the whole, it is preferable to put the instructions in groups of "uppermost digit of lower four digits of 1" or "uppermost digit of lower four digits of 0". Further, when the instructions are put into a group of half of the whole and a group of a quarter of the whole, commands are executed at a rate of 37.5%. It is also possible to apply node IDs to values of a larger number of digits for grouping. For example, grouping into 256 groups is possible if grouping is executed according to values of the lower 8 digits, and if a larger number of digits are applied, still greater grouping is possible.

[Processing Execution Determination Occurring at Data Processing Request Packet Receive Side]

In the processing described above, a description is given of a processing example where, on the data transmission request side, a node transmitting a data processing request packet is selected, an appropriate multicast address is set, and a data processing request is transmitted. Therefore, even for information processing devices receiving the data processing request, at the rule mapping processor, mapping processing is executed according to received data processing requests, and it is possible to decide whether or not to execute data processing. In other words, even if the data processing request packet is received, it is possible to determine that data processing is not executed at the rule mapping processor.

The following is a description of this processing example. A sequence for transmitting data processing requests, data processing and processing for receiving results of the data processing via the network of the information processing devices of the present invention is illustrated in FIG. 7.

In the drawing, as with the sequence view of FIG. 5 described previously, processing occurring at four network-connected information processing devices is shown, with the left end being an information processing device carrying out the data processing request, and the remaining parts of the drawing showing processing for nodes selected as nodes receiving the data processing request or nodes that are not selected.

First, in step S11, the processing request transmitting node generates a processing request command. The processing request command may be, for example, a content transmission command designating content ID, or a data processing request command resulting from the execution of a specific arithmetic processing program.

Next, in step S12, the processing request transmitting node executes rule mapping processing. This is processing occurring at the rule mapping processor described above, and may be processing setting a multicast address according to the receiving node rate, or may be processing setting a multicast address corresponding to a resource number calculated using a hash value based on the resource information.

Next, in step S13, the process request transmitting node outputs a packet set with a multicast address decided by the rule mapping to the network. This set multicast address is only received by specific nodes. In the example shown in the drawing, only node A and node C receive the packet, and node B does not receive the packet.

In step S14, node A and node C receiving the data processing request packet execute rule mapping processing in step S14. This is processing for autonomously determining whether or not an instruction is executed. There are various modes for this determination process, such as, for example, transmission path determinations for data processing request packets, and determinations based on random numbers, etc. This is described specifically in the following.

When node A makes a determination to execute a command from the results of an autonomous determination as to whether or not to execute the command in the rule mapping process, the command is executed in step S15 based on this execution determination, and the data processing results are sent to the processing request node in step S16. On the other hand, node C outputs a determination that a command is not to be executed as a result of an autonomous determination as to whether or not to execute a command occurring in rule mapping processing, and the result of this is that the command is not executed and processing ends.

Next, a description is given with reference to the process flow of. FIG. 8 to FIG. 11 of a processing procedure on the side of the information processing device receiving the data processing request.

Figure 8:
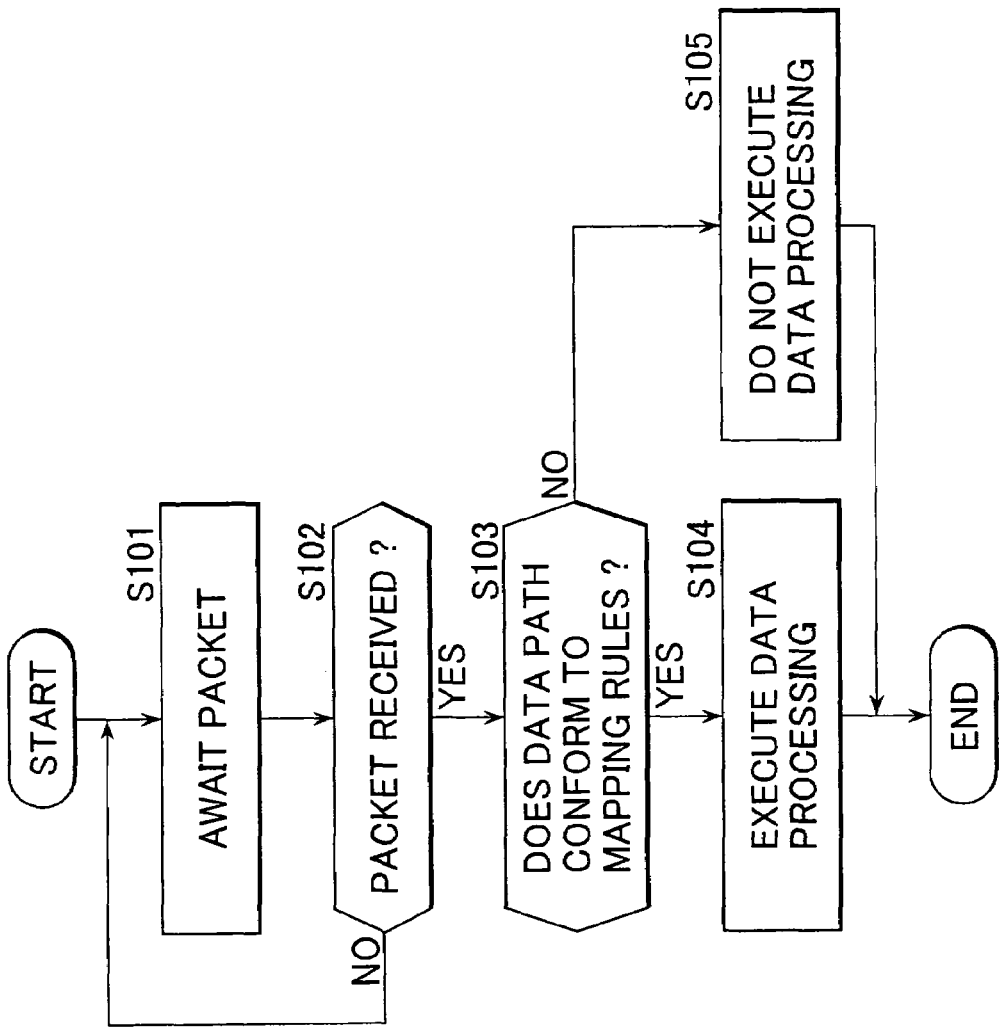
FIG. 8 is a flowchart illustrating a processing procedure occurring at an information processing device receiving a data processing request (instruction).

FIG. 8 shows a processing procedure for determining whether or not a data processing request packet passing via a transmission path conforming to the mapping rules is present and deciding whether or not to execute data processing.

First, in step S101, a data processing request packet is awaited. When it is determined in step S102 that a packet has been received, in step S103, a determination is made as to whether or not a packet passing via a transmission path conforming to the rule mapping is present.

The network-connected information processing devices are all themselves set with a rate (%) for receiving data processing requests. This corresponds to the receiving node rate described previously with reference to FIG. 3. For example, an information processing device set with a receiving rate of 3% receives packets conforming to addresses of multicast addresses [ccc.sss.xxx.aaa] corresponding to a receiving node rate of 3% of the table shown in FIG. 3 and receives packets conforming to multicast addresses corresponding to a receiving node rate of 4% or more, but is not required to receive packets set with multicast addresses of receiving node rates set to 1% or 2%.

Information processing devices receiving packets also store the table data shown in FIG. 3 in a storage unit, acquire address information set at the received packets, extract receiving node rate corresponding to addresses, and determine whether or not a multicast address corresponding to a receiving node rate of more than the receiving rate set at themselves is set.

As a result of this determination, when a multicast address corresponding to a receiving node rate of the receiving rate set at itself is set as an address for the data processing request packet, step S104 is proceeded to, and data processing is executed according to the request stored in the received data processing request packet. On the other hand, when a multicast address corresponding to a receiving node rate of the receiving rate set at itself is not set as an address for the data processing request packet, it is determined not to execute the command, i.e. step S105 is proceeded to, and processing is ended without executing data processing according to the request stored in the received data processing request packet.

An information processing device receiving this kind of data processing request (command) then autonomously determines whether to execute the command or not execute the command, and processing is carried out in accordance with this determination.

Figure 9:
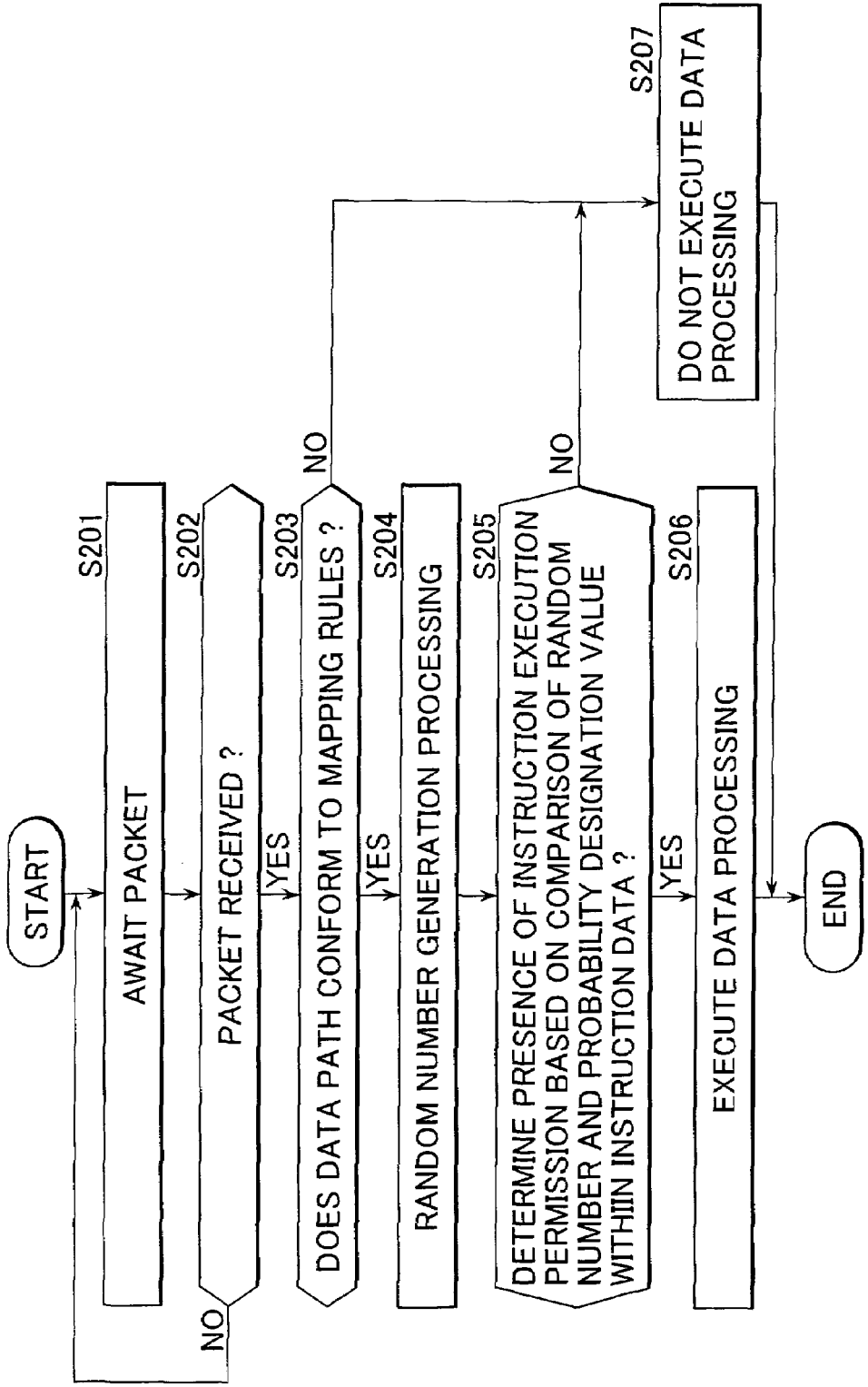
FIG. 9 is a flowchart illustrating a processing procedure occurring at an information processing device receiving a data processing request (instruction).

FIG. 9 is a flowchart showing a processing example determining whether or not a data processing request packet passing via a transmission path conforming with the mapping rules is present, having determination processing based on random numbers further added.

First, in step S201, a data processing request packet is awaited. When it is determined in step S202 that a packet has been received, in step S203, a determination is made as to whether or not a packet passing via a transmission path conforming to the rule mapping is present.

In other words, address information set at the received packet is acquired, the receiving node rate corresponding to the address is extracted, and a determination is made as to whether or not a multicast address corresponding to a receiving node rate of more than the receiving rate set at itself is present.

As a result of this determination, when a multicast address corresponding to a receiving node rate of the receiving rate set at itself is not set as an address for the data processing request packet, it is determined not to execute the command, i.e. step S207 is proceeded to, and processing is ended without executing data processing according to the request stored in the received data processing request packet.

On the other hand, when a multicast address corresponding to a receiving node rate of a receiving rate higher than that set at the device itself is set as an address of the data processing request packet, further, in step S204, random number generation processing is executed, and in step S205, the generated random number and information (rate designation value) within data stored within the data processing request packet are compared, and a determination is made to execute or not execute the command based on the results of this comparison.

For example, if the generated random number>rate designation value, if command execution is such that the random number≦rate designation value, then it is set to not execute the command, etc. If information (rate designation value) within data stored in a data processing request packet taken as a target of comparison with the random number is, for example, a content playback request, it is possible to apply a content identifier (content ID).

Further, in the case of the presence of an execution command for some kind of data processing program, a program designation identifier (ID) can be used as a comparison target value.

If a determination is made to execute the data processing request as comparison processing results based on the random number in step S205, step S206 is proceeded to, and the data processing is executed. When a determination is made not to execute the data processing request from the results of comparison processing based on the random number, step S207 is proceeded to, and processing is completed without executing data processing.

An information processing device receiving this kind of data processing request (command) then autonomously determines whether to execute the command or not execute the command based on the packet transmission path and the random number, and processing is carried out in accordance with this determination.

Figure 10:
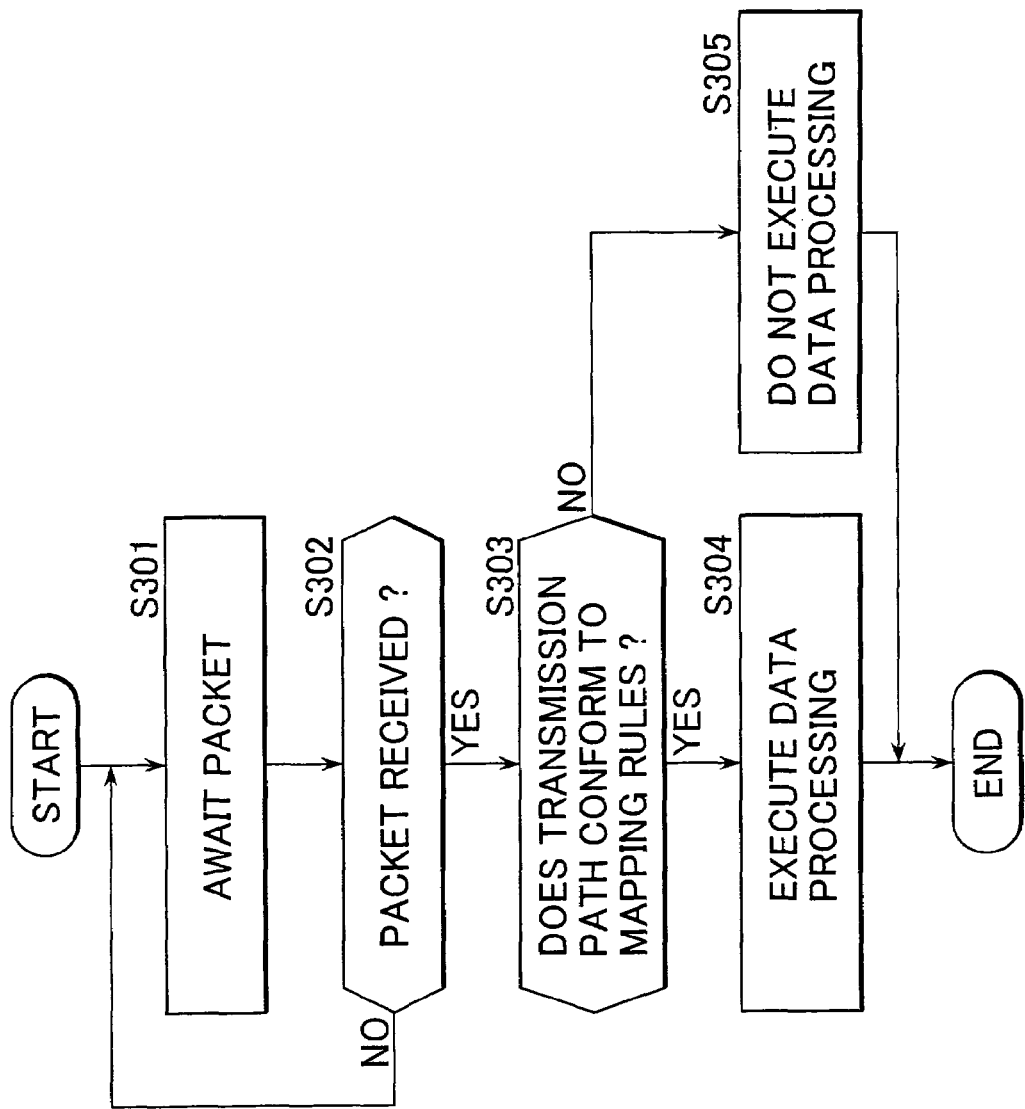
FIG. 10 is a flowchart illustrating a processing procedure occurring at an information processing device receiving a data processing request (instruction).

Next, a description is given with reference to the processing flowchart of FIG. 10 of processing where a hash value is calculated, and a determination is made as to whether or not to execute a data processing request autonomously based on a hash value on the side of an information processing device receiving a data processing request.

First, in step S301, a data processing request packet is awaited. When it is determined in step S302 that a packet has been received, in step S303, a determination is made as to whether or not a packet passing via a transmission path conforming to the rule mapping is present based on the hash value.

This is executing of processing to calculate a hash value based on resource information stored in a data packet at an information processing device that receives a data processing request, for packets received in accordance with multicast addresses corresponding to a resource number based on hash values described with reference to FIG. 4.

It is then determined whether or not a multicast address corresponding to a calculated hash value is set at a data processing request packet. In other words, the information processing device receiving the data processing request also has the table shown in FIG. 4, and executes processing to determine whether or not a self-calculated hash value and data processing request packet setting address match with correspondence of the table.

If the determination of step S303 is yes, step S304 is proceeded to, and data processing designated at the data processing packet is executed. If the determination of step S303 is no, step S305 is advanced to and processing is completed without executing data processing designated at the data processing request packet.

An information processing device receiving this kind of data processing request (command) then autonomously determines whether to execute the command or not execute the command, and processing is carried out in accordance with this determination.

Figure 11:
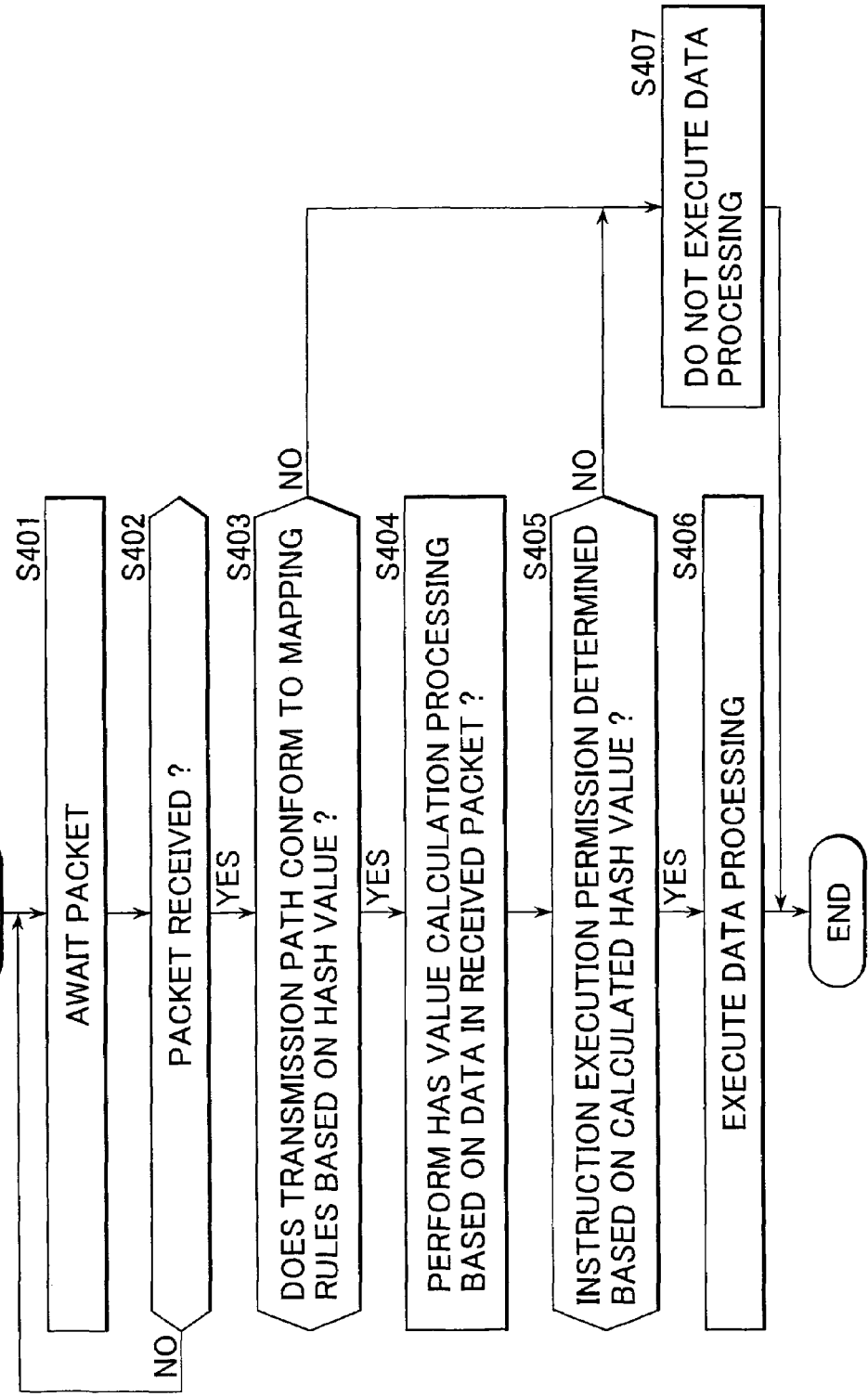
FIG. 11 is a flowchart illustrating a processing procedure occurring at an information processing device receiving a data processing request (instruction).

Next, a description is given with reference to the processing flowchart of FIG. 11 of processing for a transmission path determination carried out based on the hash value at the side of the information processing device receiving the data processing request, and processing for determining whether or not to execute a data processing request autonomously based on a new hash value based on data within the packet.

First, in step S401, a data processing request packet is awaited. When it is determined in step S402 that a packet has been received, in step S403, a determination is made as to whether or not a packet passing via a transmission path conforming to the rule mapping is present based on the hash value.

This is executing of processing to calculate a hash value based on resource information stored in a data packet at an information processing device that receives a data processing request, for packets received in accordance with multicast addresses corresponding to a resource number based on hash values described with reference to FIG. 4.

It is then determined whether or not a multicast address corresponding to a calculated hash value is set at a data processing request packet. In other words, the information processing device receiving the data processing request also has the table shown in FIG. 4, and executes processing to determine whether or not a self-calculated hash value and data processing request packet setting address match with correspondence of the table.

If the determination of step S403 is no, step S407 is proceeded to, and processing is completed without executing data processing designated at the data processing request packet. If the determination of step S403 is yes, step S404 is proceeded to, hash value generation processing is executed based on data stored within the received packet, and in step S405, a determination is made as to whether or not to execute the command based on the generated hash value.

For example, the information processing device stores respective preset threshold values in storage, and setting is adopted where, if the generated hash value>the threshold value, the command is executed, and if the generated hash value≦the threshold value, the command is not executed. If data stored in a data processing request packet taken as a hash value generation target is, for example, a content playback request, it is possible to apply a content identifier (content ID). Further, in the case of the presence of an execution command for some kind of data processing program, a program designation identifier (ID) can be used as a comparison target value.

If a determination is made to execute the data processing request as determination results based on the hash value in step S405, step S406 is proceeded to, and the data processing is executed. When a determination is made not to execute the data processing request from the results of comparison processing based on the hash value, step S407 is proceeded to, and processing is completed without executing data processing.

An information processing device receiving this kind of data processing request (command) then autonomously determines whether to execute the command or not execute the command based on the packet transmission path and the hash value, and processing is carried out in accordance with this determination.

[Processing at Wireless Communication Device, Electronic Circuit]

In the embodiment described above, a description is given of an example configuration where, at network-connected information processing devices, address settings are changed, and setting of devices executing data processing requests is carried out. Next, a description is given of an example configuration for deciding information processing devices executing data processing by changing communication conditions at a wireless communication device and of an example of processing to select a device executing data processing using, for example, transfer bus control etc. at an electronic circuit of an information processing device such as a PC etc.

Figure 12:
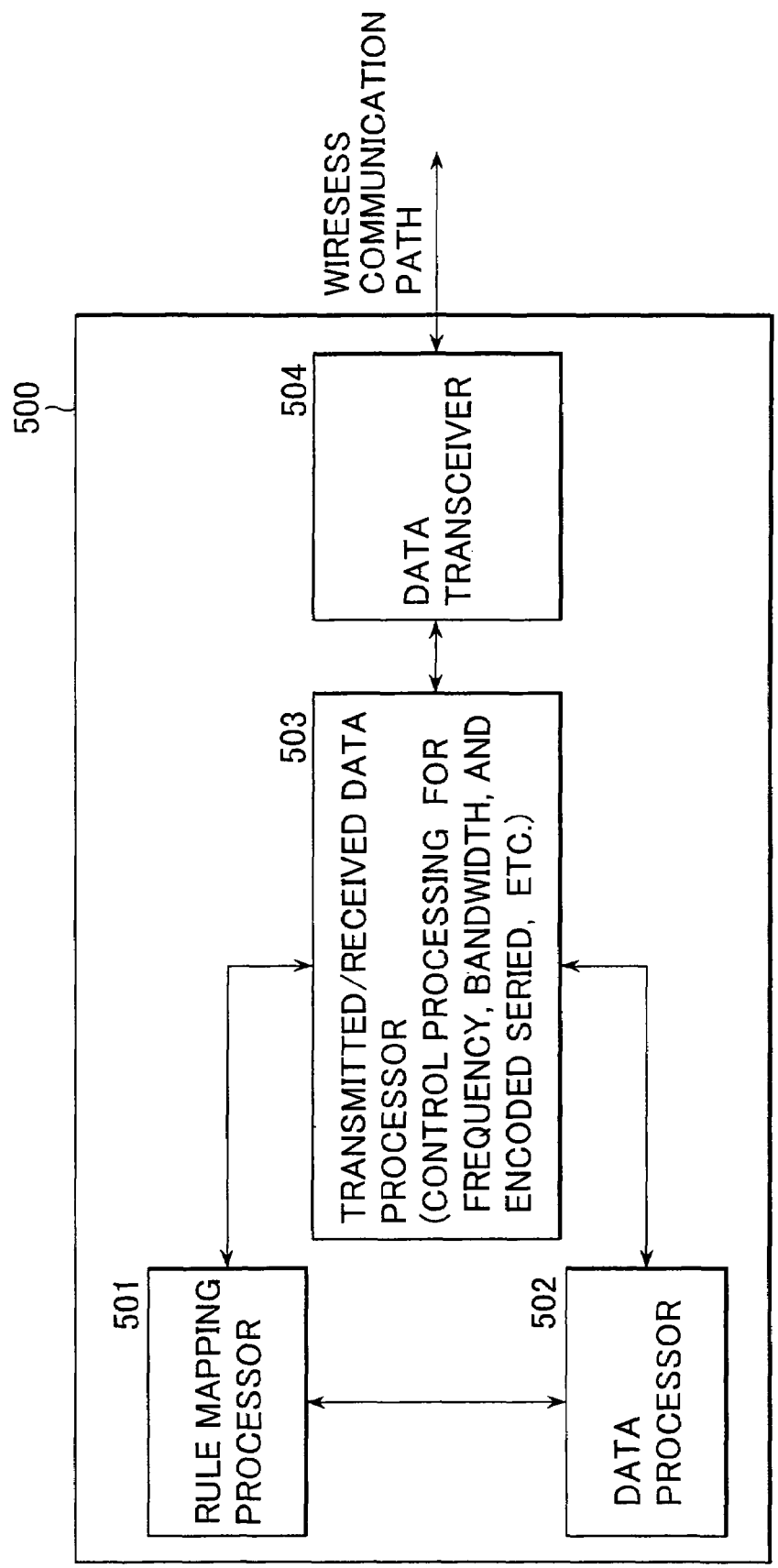
FIG. 12 is a view showing an example configuration for a device for executing wireless communication.

FIG. 12 is an example configuration for a wireless communication device in the case of applying to the present invention to a wireless communication device taken as a first mode for an information processing device. As shown in FIG. 12, a wireless communication device 500 comprises a rule mapping processor 501, data processor 502, transmitted/received data processor 503, and data transceiver 504. The data transceiver 504 executes wireless communication.

The transmitted/received data processor 503 sets frequency, bandwidth and encoding sequence for data sent from the device itself to other connected wireless communication devices so as to control transmitted data, and outputs data via the data transceiver 504. Setting information such as the frequency of the data, bandwidth, or the encoding sequence occurring in CDMA is set at the rule mapping processor 501.

The rule mapping processor 501 basically executes the following two determination processes.

(1) Processing to determine whether or not to execute (command execution) data processing in accordance with a data processing request at an own-device based on a data processing request (command) received from another wireless communication device.

(2) Executing setting processing, for example, for deciding upon information set for frequency, bandwidth, and encoding sequence etc. for a data processing request (command) sent from an own-device to another wireless communication device. In other words, a data processing request destination is decided.

Summarizing, if a request is made, the processing of (1) described above is processing for deciding whether or not an own-device accepts or rejects a request from another device, and the processing of (2) is processing for deciding whether or not a data processing request from an own-device is sent to which wireless communication device.

When a data processing request is received from another wireless communication device, the rule mapping processor 501 determines whether or not to execute data processing at its own-device using the processing of (1), and when it is determined that execution is to take place, data processing such as, for example, extracting content from storage means, or other data processing, is executed at the data processor 502 in accordance with the processing request.

In other words, when a data processing request is received from another wireless communication device, the rule mapping processor 501 determines whether or not to execute the data processing at it's own-device based on setting information such as frequency, bandwidth, and encoding sequence of the received data.

Further, when a data processing request is sent from an own-device to another wireless communication device, at the rule mapping processor 501, after executing process request output setting processing such as setting information deciding processing such as, for example, frequency, bandwidth and encoding sequence etc. of transmitted data, the decided information is outputted to the transmitted/received data processor 503. The decided information is then outputted at the transmitted/received data processor 503 to the data transceiver 504 while performing transmission data control based on the decided information.

Figure 13:
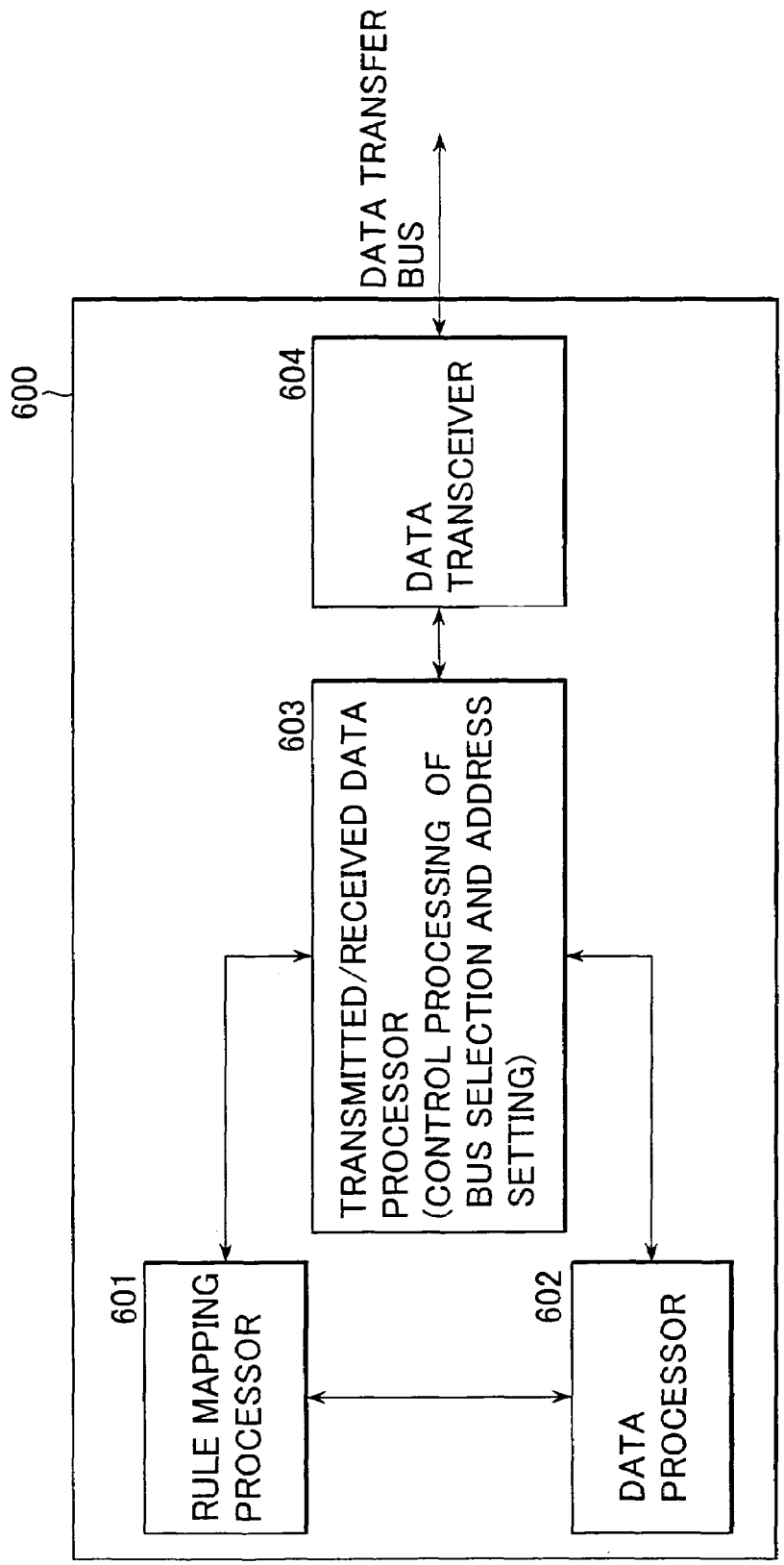
FIG. 13 is a view illustrating a device configuration for executing inputting and outputting of processing requests via a bus.

FIG. 13 is an example configuration for a single device configured at an information processing device configured for causing data processing to be executed selectively at each device for an electronic circuit (including internal circuitry for LSIs/ICs) possessed by a plurality of devices executing data processing such as PCs etc. taken as one form of an information processing device of the present invention. A device 600 shown in FIG. 13 is comprised of a rule mapping processor 601, data processor 602i transmitted/received data processor 603, and data transceiver 604. The data transceiver 604 executes transmission and receipt of data via a bus configured at the information processing device.

The transmitted/received data processor 603 outputs data via a bus applied to communication of data transmitted to other bus-connected devices, or sets an address, carries out control of transmitted data, and outputs data via the data transceiver 604. In cases where this example configuration is applied to electronic circuits (including internal circuitry of LSIs/ICs), it is common to employ an address for an internal bus of a high-speed serial bus or parallel bus etc., an interrupt address, or packet communication in the case of a high-speed serial bus in place of a network address, and control of selection of this packet address can be controlled. Further, if a plurality of serial buses are passed through, unique IDs are set to each of these buses. Setting information for the applicable bus and address etc. of the transmitted data is set at a rule mapping processor 601.

The rule mapping processor 601 basically executes the following two determination processes.

(1) Processing to determine whether or not to execute (command execution) data processing in accordance with a data processing request at an own-device based on a data processing request (command) inputted from another device.

(2) Executing setting processing, for example, for deciding upon information set for the applicable bus and addresses etc., for a data processing request (command) outputted from an own-device to another device. In other words, a data processing request destination is decided.

When a data processing request is inputted from another device, the rule mapping processor 601 determines whether or not to execute data processing at its own-device using the processing of (1). When it is determined that execution is to take place, data processing is executed in accordance with the processing request at a data processor 602. In other words, when a data processing request is received from another device, the rule mapping processor 601 determines whether or not to execute the data processing at it's own-device based on information such as applicable bus and address etc. of the received data.

Further, when a data processing request is outputted from an own-device to another device, at the rule mapping processor 601, after executing process request output mode setting processing such as setting information deciding processing such as, for example, setting the applicable bus and address etc. of transmitted data, the decided information is outputted to the transmitted/received data processor 603. The decided information is then outputted at the transmitted/received data processor 603 to the data transceiver 604 while performing transmission data control based on the decided information.

With the various information processing devices described above, it is necessary to group into devices or equipment in order to select devices or equipment for executing data processing.

A description is given above of grouping based on IDs set at network-connected information processing devices with reference to FIG. 6, but a description of an example of different grouping processing is described with reference to FIG. 14. In the above example, a description is given of a configuration where a data processing request (command) is sent to specifically selected nodes (information processing devices) by applying a multicast address. However, it is necessary to carry out precise grouping processing for each node in order to set multicast addresses for executing transmission of data processing request packets to nodes of, for example, 10%. The following is a description of a detailed example of this grouping processing.

FIG. 6 is a view illustrating an example of setting node identifiers (node IDs) at each information processing device and grouping according to node ID. Node IDs of multiple digits are allocated to each information processing device.

The examples shown in FIG. 14 show examples of groupings for devices for executing commands such as, for example, network-connected information processing devices, wireless communication devices for executing wireless communication, or bus-connected devices.

Identifiers (IDs) are set for each of the network-connected information processing devices, wireless communication devices for executing wireless communication, or bus-connected devices (in the following, these are referred to generally as "devices"). Attention is only paid to the lower four digits of this ID, with each device being grouped according to the values of the lower four digits. First, group 1 is divided into two sections according to whether the uppermost digit of the lower four digits is 0 or 1, group 2 is divided into four sections according to whether the upper two digits are any one of 00, 01, 10 or 11, group 3 is divided into 8 sections according to the values of the upper three digits, and group 4 is divided into 16 sections according to the values of the four digits.

In processing applied at the network-connected information processing devices, a network IP address (multicast address) is set for each group, and with wireless communication, and an applied frequency and applied encoding sequence (CDMA) is set for each group. Further, an applicable bus is set in the bus-connected device configuration.

As a result of this grouping processing, it is possible to divide up the whole into groups of numbers of halves, quarters, eighths, or sixteenths. For example, when it is wished to execute a command at a rate of half of the whole, it is preferable to put the instructions in groups of "uppermost digit of lower four digits of 1" or "uppermost digit of lower four digits of 0". Further, when the instructions are put into a group of half of the whole and a group of a quarter of the whole, commands are executed at a rate of 37.5%.

It is also possible to apply device IDs to values of a larger number of digits for grouping. For example, grouping into 256 groups is possible if grouping is executed according to values of the lower 8 digits, and if a larger number of digits are applied, still greater grouping is possible.

[Information Processing Device Hardware Configuration]

Next, a description is given of an example hardware configuration for the information processing device described in the above embodiments.

An example of an information processing device equipped with a CPU (Central Processing Unit) as control means is shown in FIG. 15. The configuration shown in FIG. 15 is now described.

A CPU (Central Processing Unit) 901 is a processor for executing each type of program. A ROM (Read-Only-Memory) 902 stores programs executed by the CPU 901 or fixed data taken as arithmetic parameters. RAM (Random Access Memory) 903 is a storage area for storing programs executed in processing for the CPU 901 and parameters appropriately changing in the program processing, and can be used as a work area.

The HDD 904 executes hard disc control, and executes storage processing and reading processing for various kinds of data and programs to the hard disc. An encoding/decoding processor 905 executes processing for encoding processing of transmitted data such as content and decoding processing of received data according to the processing described above.

A bus 921 is configured from a PCI (Peripheral Component Internet/Interface) bus etc. and is capable of transferring data with input/output devices via each module and the input/output interface 822.

An input unit 911 is an input unit containing, for example, a keyboard and pointing device. When the input unit 911 is operated via a keyboard or mouse etc., or when data is received from a communication unit 913, a command is inputted to the CPU 901, and a program stored in the ROM (Read Only Memory) 902 is executed. The output unit 912 is, for example, a CRT or liquid crystal display etc., displaying each type of information as text or images, etc.

The communication unit 913 executes communication between information processing devices or communication processing with other entities, and executes processing to provide data from each storage unit, transmit data processed by the CPU 901 and encoding/decoding processor 905, and receive data from other entities, under the control of the CPU 901.

The drive 914 is a drive for executing recording and playing back of a removable recording medium 915 such as a flexible disc, CD-ROM (Compact Disc Read Only Memory), MO (Magneto optical) disc, DVD (Digital Versatile Disc), magnetic disc, or semiconductor memory etc., and executes playback of programs and data from each removable recording medium 915, and stores programs and data to the removable recording medium 915.

When programs or data recorded on each storage medium are read out and executed or processed at the CPU 901, the read-out programs and data are provided to, for example, the RAM 903 connected via an input/output interface 922 and a bus 921.

Each process described in this specification is capable of being executed using hardware, software, or a combination of both. When a series of processes are executed using software, it is possible to store and provide programs on program-readable storage media such as flexible discs or CD-ROMs etc. to computers incorporating programs constituting this software into dedicated hardware or to, for example, general purpose personal computers etc. capable of executing each type of function by installing each type of program. The programs may also be downloaded via a communication network such as the Internet.

Specifically, the program can be pre-recorded on a hard disc or ROM (Read Only Memory) taken as a recording medium. Alternatively, the programs may be temporarily or permanently stored (recorded) on a removable recording media such as a flexible disc, CD-ROM (Compact Disc Read Only Memory), MO (Magneto optical) disc, DVD (Digital Versatile Disc), magnetic disc, or semiconductor memory, etc. The removable recording media may also be provided as so-called package software.

Further, in addition to being installed to a computer from the kind of removable recording medium described above, the programs may be transferred to the computer in a wireless manner from a download area or in a wired manner to a computer via a network such as a LAN (Local Area Network) or the Internet. The programs transferred in this manner are then received by the computer and can be installed in a recording medium such as a built-in hard disc, etc.

Each type of process disclosed in this specification may be executed not only in chronological order in accordance with the description, but may also be executed according to the processing performance of the device executing the processing, or in parallel or individually as necessary. Further, the system in this specification is a configuration where a plurality of devices are logically collected together, and is by no means limited to each device of the configuration being in the same case.

In the above, a detailed description is given of the present invention while referring to a specific preferred embodiment. However, it is evident that various modifications and substitutions may be made to the embodiments by one skilled in the art without deviating from the scope of the present invention. In other words, the present invention is disclosed in the form of exemplification, and the present invention must by no means be interpreted as being limited in this respect. Please consider the scope of the patent claims disclosed herein in discerning the essential essence of the present invention.

INDUSTRIAL APPLICABILITY

As described above, according to the configuration of the present invention, a rule mapping processor for determining whether or not to execute data processing based on data processing requests received from other devices is provided, and at the route mapping processor, processing is carried out to determine whether or not to execute data processing corresponding to received data processing requests based on data transmission information for data processing requests received via the data receiver. Determination of execution or non-execution of autonomous processing is possible with this configuration so that in distributed data processing occurring at, for example, a P2P-connected network configuration etc., it is possible to eliminate procedures such as selection of nodes executing processing and therefore enable efficient data processing, packet transmission accompanying deciding of processing nodes can be reduced, and reduction of network traffic may also be made possible.

In addition, according to this configuration, processing is carried out to determine whether or not to execute data processing based on comparisons of values stored in data processing requests and generated random numbers, or comparisons of hash values for values stored in data processing requests and preset threshold values. This enables still greater control of selection of data processing at the information processing device receiving data processing requests.

Further, according to the configuration of the present invention, the rule mapping processor comprises a multicast address data table correlating receiving node rates and multicast address data, and is capable of comparing an address extracted from the multicast address data table based on a command receiving rate set at an own-device and an address set for a data processing request received via the data receiver, and carrying out processing to determine whether or not to execute data processing based on the comparison results.

Moreover, according to the configuration of the present invention, the rule mapping processor comprises a multicast address data table correlating resource numbers and multicast address data, and is capable of calculating a hash value based on resource information stored in the data processing request received via the data receiver, determines whether or not the hash value and a setting address of the data processing request match with corresponding items in the table, and carrying out processing to determine whether or not to execute data processing based on the determination.

According to the configuration of the present invention, in the case of wireless communication devices, it is possible to carry out processing to determine whether or not to execute data processing based on information of at least one of setting information for the receiving frequency, bandwidth, and/or encoding sequence of a data processing request. Further, in the case of devices constituted by electronic circuits, it is possible to carry out processing to determine whether or not to execute data processing based on information of at least one of setting information for an input bus or address of a data processing request inputted from another device, and this enables control of data processing where the processing load is distributed to be executed efficiently.

The invention claimed is:

1. An information processing device comprising: a data receiver configured to receive a data processing request including a multicast address;
   a rule mapping processor configured to determine whether or not to execute data processing based on the multicast address of received data processing request, the determination whether to execute data being based on information included in the multicast address, the information indicating at least a percentage of nodes of a network receiving the data processing request and a generated random number or a level of an available computing performance from nodes of the network; and
   a data processor configured to execute data processing based on a determination of said rule mapping processor.

2. The information processing device as described in claim 1,
   wherein said rule mapping processor is further configured to map at least the percentage of the receiving nodes to a first multicast address that corresponds to nodes having the reception percentage, or by mapping at least the available computing performance to a second multicast address that corresponds to nodes that are able to provide a certain level of available computing performance.

3. The information processing device as described in claim 1, wherein said rule mapping processor is further configured to determine whether or not to execute data processing based on a comparison of a hash value for representing the available computing performance.

4. The information processing device as described in claim 2, wherein said rule mapping processor comprises a first multicast address data table configured to correlate the percentage of nodes receiving the data processing request and multicast address data, and the rule mapping processor is further configured
   to compare an address extracted from said first multicast address data table based on a reception percentage of the information processing device and an address set for a data processing request received via said data receiver, and
   to determine whether or not to execute data processing based on said comparison results.

5. The information processing device as described in claim 2, wherein said rule mapping processor comprises a second multicast address data table configured to correlate the available computing performance and multicast address data; and
the rule mapping processor is further configured
- to calculate a hash value representing the available computing performance that is stored in said data processing request received via said data receiver;
- to determine first whether or not said hash value and a setting address of said data processing request match with corresponding entries in said second multicast address data table; and
- to determine whether or not to execute data processing based on said first determination.

6. The information processing device as described in claim 1, wherein said information processing device is a wireless communication device, and
said rule mapping processor is further configured to determine whether or not to execute data processing based on information of at least one of receiving frequency, bandwidth, and/or encoding sequence of a data processing request received from another wireless communication device.

7. The information processing device as described in claim 1, wherein said information processing device is an electronic circuit, and
said rule mapping processor is configured to determine whether or not to execute data processing based on information of at least one of setting information for an input bus or address of a data processing request inputted from an external information processing device.

8. The information processing device as described in claim 1, wherein said computing performance includes at least one of an information on CPU performance, storage capacity, or network bandwidth of nodes.

9. An information processing method comprising:
receiving a data processing request including a multicast address;
mapping a rule that determines whether or not to execute data processing based on the multicast address of said receiving the data processing request, said rule whether to execute data being based on information included in the multicast address, the information indicating at least a percentage of nodes of a network receiving the data processing request, and a generated random number or a level of an available computing performance from nodes of the network; and
executing data processing based on a determination of said mapping the rule.

10. The information processing method as described in claim 9, wherein said mapping the rule further includes:
mapping at least the percentage of the receiving nodes to a first multicast address that corresponds to nodes having the reception percentage, or by mapping at least the available computing performance to a second multicast address that corresponds to nodes that are able to provide a certain level of available computing performance.

11. The information processing method as described in claim 9, wherein said mapping the rule further includes determining whether or not to execute data processing based on a comparison of a hash value that represents the available computing performance.

12. The information processing method as described in claim 10, wherein said mapping the rule further comprises:
using a first multicast address data table to correlate the percentage of nodes receiving the data processing request and multicast address data;
comparing an address extracted from said first multicast address data table based on a reception percentage of said information processing device and an address set for a data processing request received by said receiving the data processing request; and
determining whether or not to execute data processing based on a result of said comparing.

13. The information processing method as described in claim 10, wherein said mapping the rule further includes
using a second multicast address data table to correlate the available computing performance and multicast address data;
calculating a hash value representing the available computing performance stored in said data processing request received by said receiving the data processing request;
first determining whether or not said hash value and a setting address of said data processing request match with corresponding entries in said second data table; and
second determining whether or not to execute data processing based on said first determining.

14. The information processing method as described in claim 9, wherein said mapping the rule further comprises
determining whether or not to execute data processing based on information of at least one of receiving frequency, bandwidth, and/or encoding sequence of a data processing request received from another wireless communication device.

15. The information processing method as described in claim 9, wherein said mapping the rule further comprises
determining whether or not to execute data processing based on information of at least one of setting information for an input bus or address of a data processing request inputted from an external information processing device.

16. The information processing method as described in claim 9, wherein said computing performance includes at least one of information on CPU performance, storage capacity, or network bandwidth of nodes.

17. A recording medium having instruction code recorded thereon, the instruction code executable on a processor, the instruction code configured to perform a method when executed on the processor including:
mapping a rule that determines whether or not to execute data processing based on a multicast address of data processing request, said rule whether to execute data being based on information included in the multicast address, the information indicating at least a percentage of nodes of a network receiving the data processing request and a generated random number or a level of an available computing performance available from nodes of the network, and
executing data processing based on a determination of said mapping the rule.

18. The recording medium as described in claim 17, said mapping the rule further comprising:
mapping at least the percentage of the receiving nodes to a first multicast address that corresponds to nodes having the reception percentage, or by mapping at least the available computing performance to a second multicast address that corresponds to nodes that are able to provide a certain level of available computing performance.

* * * * *